US012639716B1

(12) United States Patent
Karimzadeh

(10) Patent No.: US 12,639,716 B1
(45) Date of Patent: May 26, 2026

(54) METHOD AND SYSTEM FOR AUTHENTICATING REMOTE TRANSACTIONS USING MULTIPLE IDENTIFIERS AND NO ENCRYPTION

(71) Applicant: Mansour Aaron Karimzadeh, Great Neck, NY (US)

(72) Inventor: Mansour Aaron Karimzadeh, Great Neck, NY (US)

( * ) Notice: Subject to any disclaimer, the term of this patent is extended or adjusted under 35 U.S.C. 154(b) by 0 days.

(21) Appl. No.: 19/005,942

(22) Filed: Dec. 30, 2024

Related U.S. Application Data

(60) Provisional application No. 63/615,399, filed on Dec. 28, 2023.

(51) Int. Cl.
$\quad$ G06Q 40/00 $\qquad$ (2023.01)
$\quad$ G06Q 20/40 $\qquad$ (2012.01)
(52) U.S. Cl.
$\quad$ CPC ................................. G06Q 20/4016 (2013.01)
(58) Field of Classification Search
$\quad$ CPC .................................................. G06Q 20/4016
$\quad$ See application file for complete search history.

(56) References Cited

U.S. PATENT DOCUMENTS

| | | | |
|---|---|---|---|
| 10,395,053 B2 * | 8/2019 | Samid | ................. G06F 21/6236 |
| 12,229,777 B1 * | 2/2025 | Hayman | .............. G06Q 20/389 |
| 2015/0195088 A1 * | 7/2015 | Rostami | ................ H04L 9/3278 |
| | | | 380/28 |
| 2015/0222619 A1 * | 8/2015 | Hughes | ................. H04L 9/0852 |
| | | | 713/168 |

(Continued)

FOREIGN PATENT DOCUMENTS

| | | | | |
|---|---|---|---|---|
| CN | 116980191 | * 10/2023 | ......... | H04L 63/0869 |
| WO | WO-2021016311 A1 | * 1/2021 | .............. | H04L 9/50 |

(Continued)

OTHER PUBLICATIONS

Lee et al., "Instant-Privacy-Preserving Biometric Authentication for Hamming Distance," Seoul National University, Republic of Korea, 2018 (Year: 2018).*

(Continued)

*Primary Examiner* — Abhishek Vyas
*Assistant Examiner* — William B. Bunker
(74) *Attorney, Agent, or Firm* — BKDowd Law, P.C.; Betsy Kingsbury Dowd, Esq.

(57) ABSTRACT

A system and method for authenticating a remote transaction relies on modified user identifiers, each having a user identifier associated with a registered user obfuscated therein, a first one stored on an authentication device and a second one on a user device in a registration process. A first bitwise distance is calculated between the first modified user identifier and a modified user identifier that is based on the second modified user identifier from the registration process. A second bitwise distance is calculated between the first modified user identifier from the registration process and a modified user identifier that is based on the second modified user identifier received in a receiving step for confirming the transaction from the user device. An authenticity is determined by comparing the first and second bitwise distances to identify a presence or absence of anomalies in the second modified user identifier received in the receiving step.

21 Claims, 19 Drawing Sheets

<u>200</u>

(56) References Cited

U.S. PATENT DOCUMENTS

| 2017/0251014 | A1* | 8/2017 | Eisen | G06Q 20/4016 |
| 2018/0262511 | A1* | 9/2018 | Guo | G06Q 20/3224 |
| 2019/0372771 | A1* | 12/2019 | Wagner | H04L 9/3231 |
| 2020/0127821 | A1* | 4/2020 | Dolev | H04L 9/0861 |
| 2022/0150245 | A1* | 5/2022 | August | H04L 67/54 |

FOREIGN PATENT DOCUMENTS

| WO | WO-2023159203 A2 * | 8/2023 | G06Q 20/36 |
| WO | WO-2024150508 A1 * | 7/2024 | H04L 63/0861 |

OTHER PUBLICATIONS

Arjona et al., "A Dual-Factor Access Control System Based on Device and User Intrinsic Identifiers," Instituto de Microelectronica de Sevilla, Seville, Spain 2014 (Year: 2014).*

* cited by examiner

Figure 1A    <u>200</u>
Service Request Domain
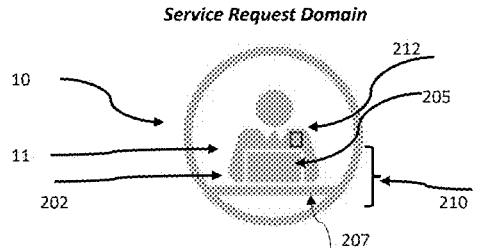
Service Provider Domain
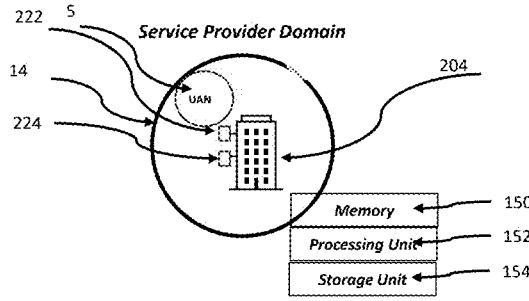
User Device Domain
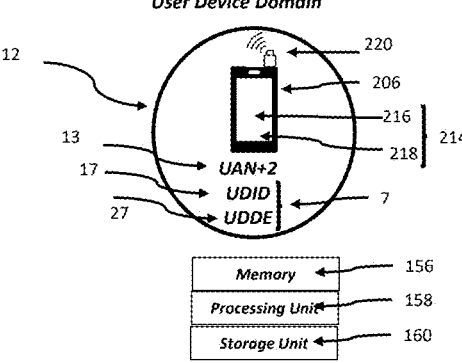
Authentication Domain
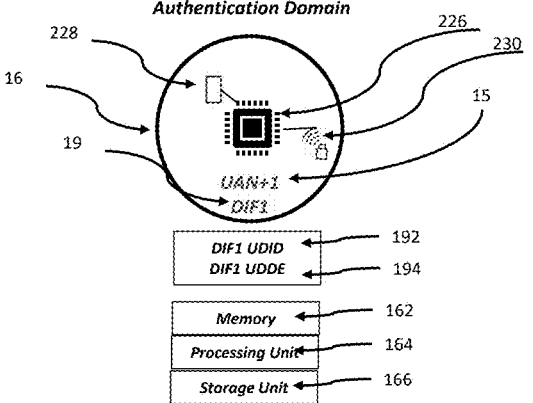

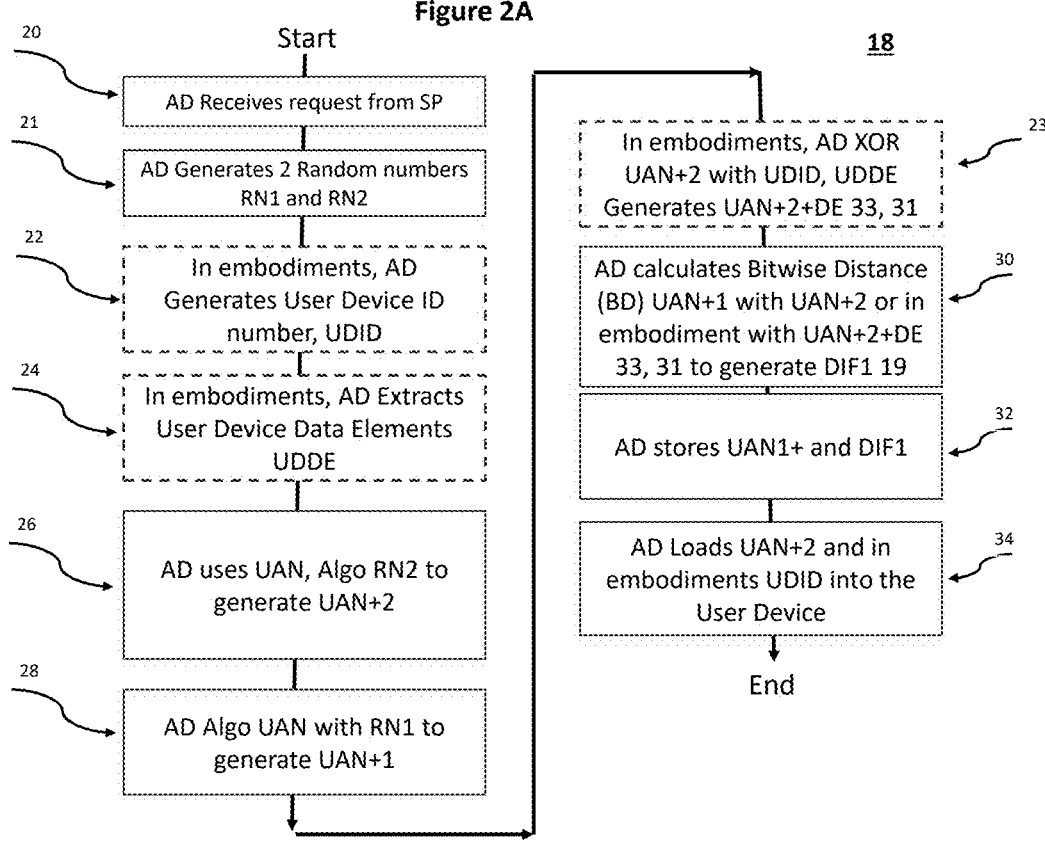

20

Start

AD Receives request from SP

21

AD Generates 2 Random numbers RN1 and RN2

22

In embodiments, AD Generates User Device ID number, UDID

24

In embodiments, AD Extracts User Device Data Elements UDDE

26

AD uses UAN, Algo RN2 to generate UAN+2

28

AD Algo UAN with RN1 to generate UAN+1

18

23

In embodiments, AD XOR UAN+2 with UDID, UDDE Generates UAN+2+DE 33, 31

30

AD calculates Bitwise Distance (BD) UAN+1 with UAN+2 or in embodiment with UAN+2+DE 33, 31 to generate DIF1 19

32

AD stores UAN1+ and DIF1

34

AD Loads UAN+2 and in embodiments UDID into the User Device

End

Start          Figure 2B
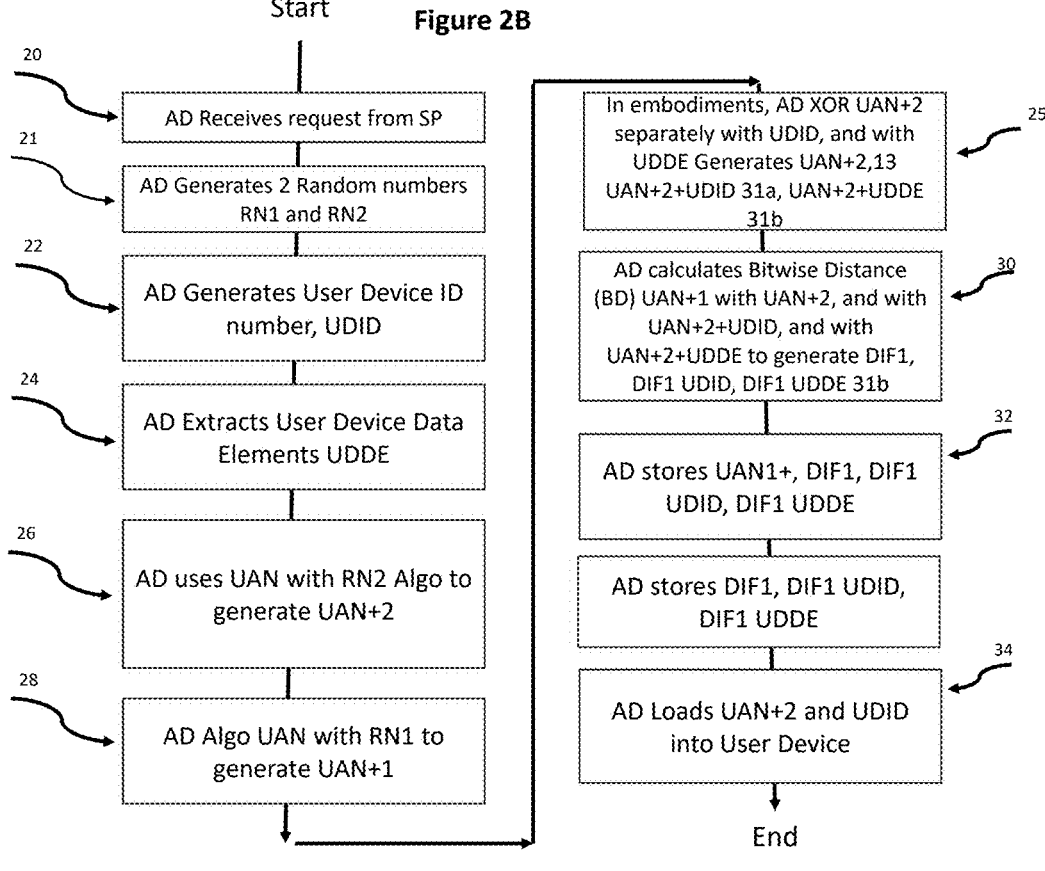

Figure 3A

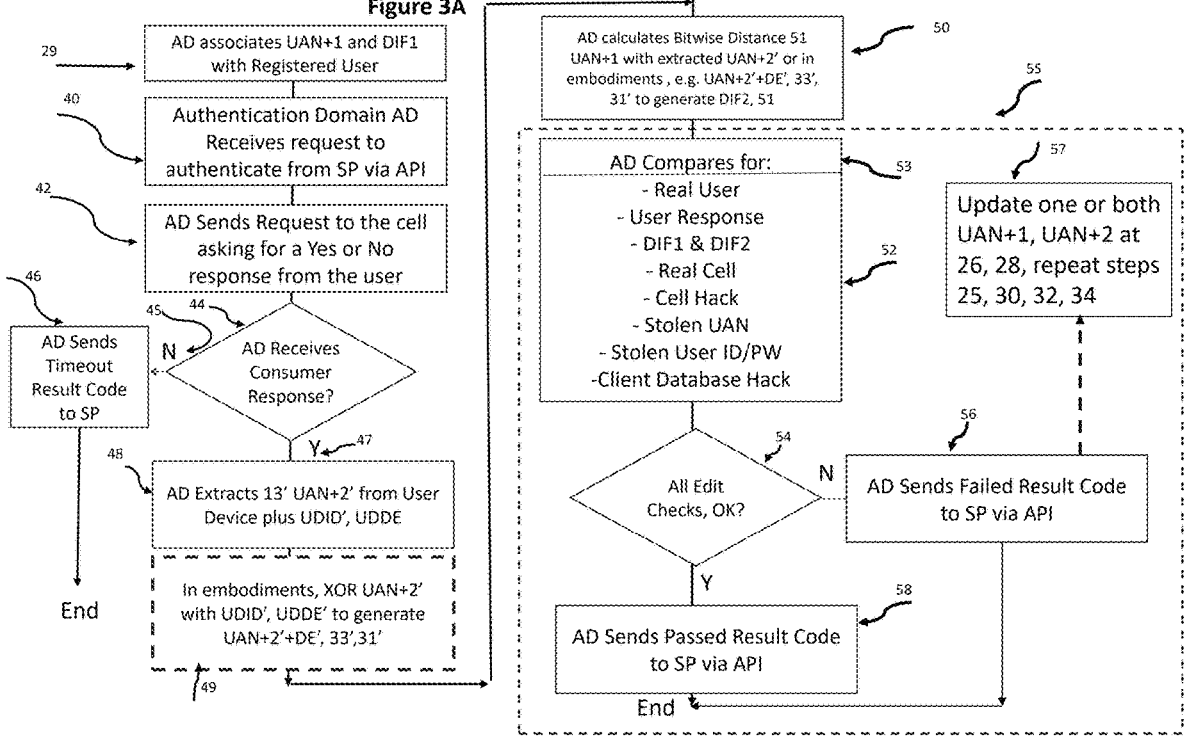

29 → AD associates UAN+1 and DIF1 with Registered User

40 → Authentication Domain AD Receives request to authenticate from SP via API

42 → AD Sends Request to the cell asking for a Yes or No response from the user

44 → AD Receives Consumer Response?

45 N →

46 → AD Sends Timeout Result Code to SP

End

47 Y →

48 → AD Extracts 13' UAN+2' from User Device plus UDID', UDDE

In embodiments, XOR UAN+2' with UDID', UDDE' to generate UAN+2'+DE', 33',31'

49

50 → AD calculates Bitwise Distance 51 UAN+1 with extracted UAN+2' or in embodiments , e.g. UAN+2'+DE', 33', 31' to generate DIF2, 51

53 AD Compares for:
- Real User
- User Response
- DIF1 & DIF2
- Real Cell
- Cell Hack
- Stolen UAN
- Stolen User ID/PW
-Client Database Hack

52

54 All Edit Checks, OK?

N → 56 AD Sends Failed Result Code to SP via API

55

57 Update one or both UAN+1, UAN+2 at 26, 28, repeat steps 25, 30, 32, 34

Y

58 → AD Sends Passed Result Code to SP via API

End

Stored at
Authentication
Domain Device

Retrieve from
User Device

Figures 8, 9:
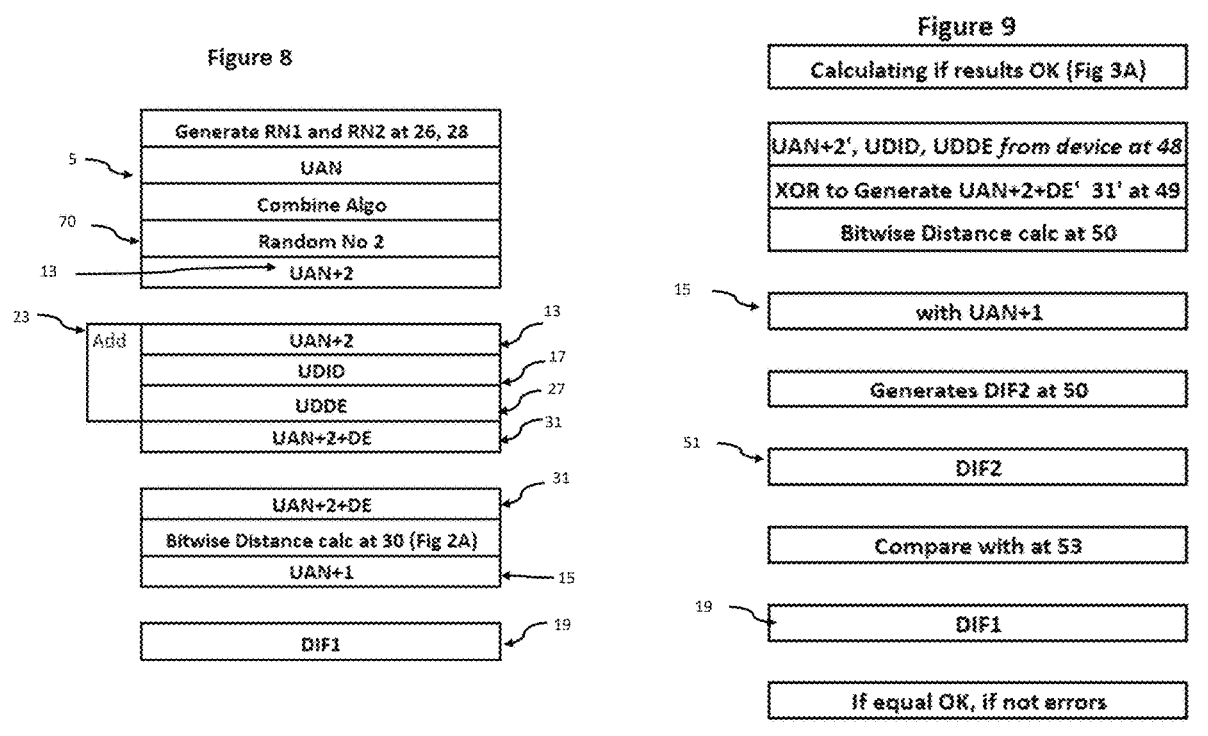

| Generate RN1 and RN2 at 26, 28 |
| UAN |
| Combine Algo |
| Random No 2 |
| UAN+2 |

5

70

13

23

| Add | UAN+2 |
| | UDID |
| | UDDE |
| | UAN+2+DE |

13

17

27

31

| UAN+2+DE |
| Bitwise Distance calc at 30 (Fig 2A) |
| UAN+1 |

31

15

| DIF1 |

| Calculating if results OK (Fig 3A) |

| UAN+2', UDID, UDDE *from device at 48* |
| XOR to Generate UAN+2+DE' 31' at 49 |
| Bitwise Distance calc at 50 |

15

| with UAN+1 |

| Generates DIF2 at 50 |

51

| DIF2 |

| Compare with at 53 |

19

| DIF1 |

| If equal OK, if not errors |

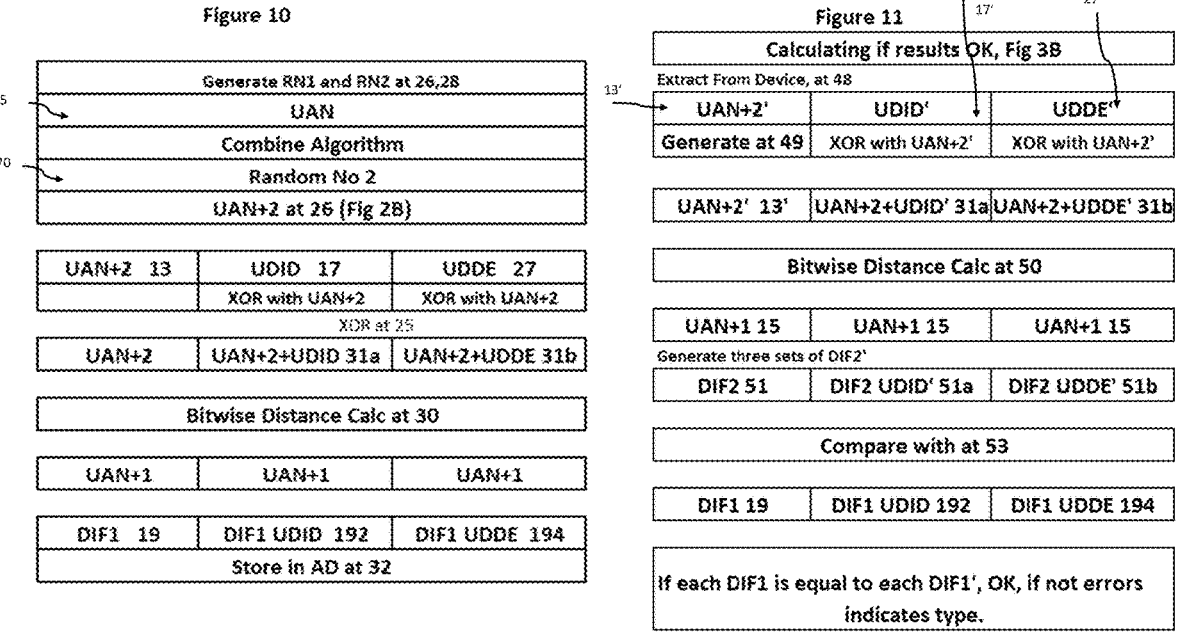

Figure 10

| Generate RN1 and RN2 at 26,28 | | |
|---|---|---|
| UAN | | |
| Combine Algorithm | | |
| Random No 2 | | |
| UAN+2 at 26 (Fig 2B) | | |

| UAN+2   13 | UDID   17 | UDDE   27 |
|---|---|---|
| | XOR with UAN+2 | XOR with UAN+2 |
| XOR at 25 | | |
| UAN+2 | UAN+2+UDID 31a | UAN+2+UDDE 31b |

| Bitwise Distance Calc at 30 | | |
|---|---|---|

| UAN+1 | UAN+1 | UAN+1 |
|---|---|---|

| DIF1   19 | DIF1 UDID  192 | DIF1 UDDE  194 |
|---|---|---|
| Store in AD at 32 | | |

Figure 11

| Calculating if results OK, Fig 3B | | |
|---|---|---|
| Extract From Device, at 48 | | |
| UAN+2' | UDID' | UDDE' |
| Generate at 49 | XOR with UAN+2' | XOR with UAN+2' |

| UAN+2'  13' | UAN+2+UDID' 31a | UAN+2+UDDE' 31b |
|---|---|---|

| Bitwise Distance Calc at 50 | | |
|---|---|---|

| UAN+1 15 | UAN+1 15 | UAN+1 15 |
|---|---|---|
| Generate three sets of DIF2' | | |
| DIF2 51 | DIF2 UDID' 51a | DIF2 UDDE' 51b |

| Compare with at 53 | | |
|---|---|---|

| DIF1 19 | DIF1 UDID 192 | DIF1 UDDE 194 |
|---|---|---|

| If each DIF1 is equal to each DIF1', OK, if not errors indicates type. | | |
|---|---|---|

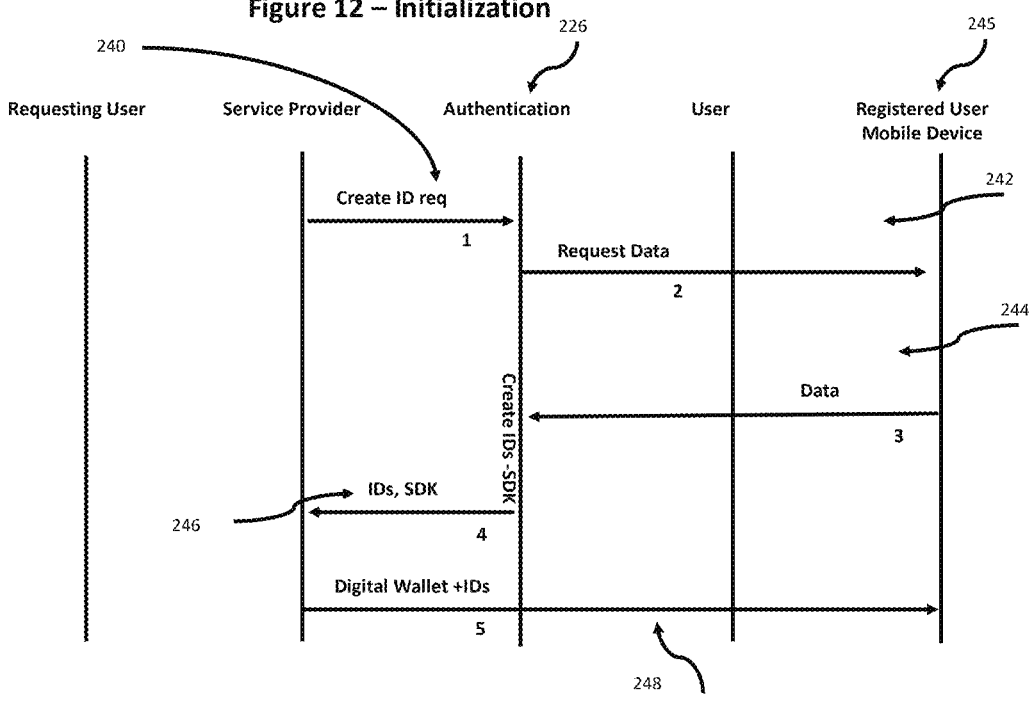
Figure 12 – Initialization

Figure 13 – Approved Transaction
Response = Yes , Analysis = Good
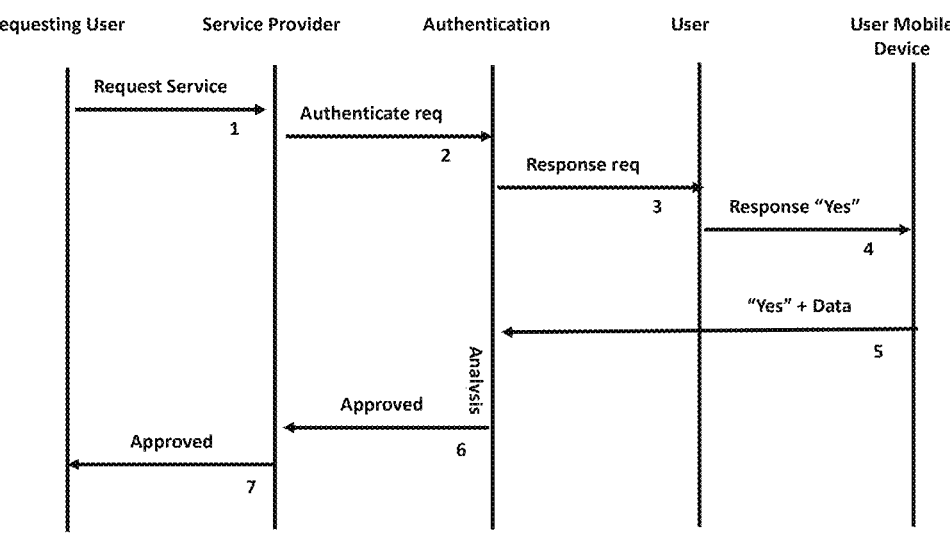

**Figure 14 –Declined Transaction
Response=Yes – Analysis=Bad**
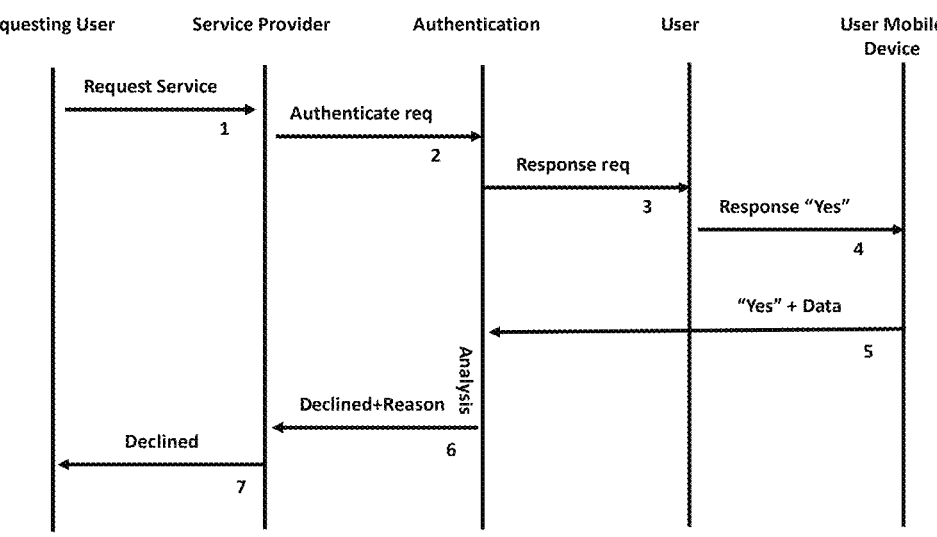

Figure 15 – Fraudulent Transaction Response=No
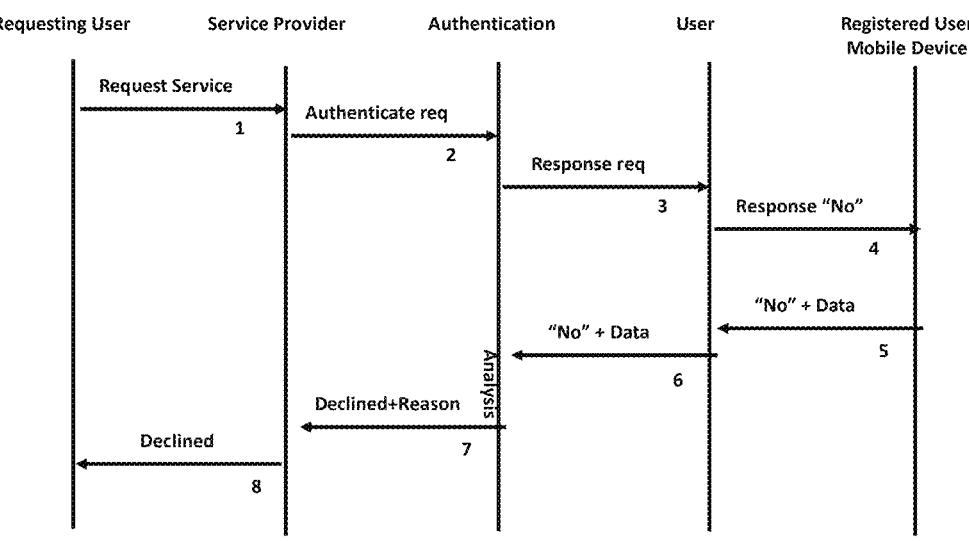

Figure 16

| 1 | User Account Number UAN | Decimal | | 6 | | | 4 | | | 2 | | | 5 | |
|---|---|---|---|---|---|---|---|---|---|---|---|---|---|---|
| | | Hex | 0 1 | 1 0 | 0 1 | 0 0 | 0 0 | 1 0 | 0 1 | 0 1 |
| 2 | Random Numbers 1 | Decimal | | 1 | | | 8 | | | 4 | | | 2 | |
| | | Hex | 0 0 | 0 1 | 1 0 | 0 0 | 0 1 | 0 0 | 0 0 | 1 0 |
| 3 | Combined Data - UAN+1 | Hex | 0 0 1 0 | 1 0 0 1 | 0 1 1 0 | 0 0 0 0 | 0 0 0 1 | 1 0 0 0 | 0 0 1 0 | 0 1 1 0 |
| | | Decimal | 2 | 9 | 6 | 0 | 1 | 8 | 2 | 6 |

| 1A | User Account Number UAN | Decimal | | 6 | | | 4 | | | 2 | | | 5 | |
|---|---|---|---|---|---|---|---|---|---|---|---|---|---|---|
| | | Hex | 0 1 | 1 0 | 0 1 | 0 0 | 0 0 | 1 0 | 0 1 | 0 1 |
| 2 | Random Numbers 2 | Decimal | | 4 | | | 5 | | | 0 | | | 3 | |
| | | Hex | 0 1 | 0 0 | 0 1 | 0 1 | 0 0 | 0 0 | 0 0 | 1 1 |
| 3 | Combined Data - UAN+2 | Hex | 0 0 1 1 | 1 0 0 0 | 0 0 1 1 | 0 0 0 1 | 0 0 0 0 | 1 0 0 0 | 0 0 1 0 | 0 1 1 1 |
| | | Decimal | 3 | 8 | 3 | 1 | 0 | 8 | 2 | 7 |

Figure 17

METHOD AND SYSTEM FOR AUTHENTICATING REMOTE TRANSACTIONS USING MULTIPLE IDENTIFIERS AND NO ENCRYPTION

CROSS-REFERENCE TO RELATED APPLICATIONS

This application claims the benefit of U.S. Provisional Application Ser. No. 63/615,399, entitled "METHOD AND SYSTEM FOR PROVIDING SECURE AUTHENTICA-TION OF REMOTE USER DEVICES WITH MULTIPLE REMOTE IDENTIFIERS," filed Dec. 28, 2023, the entirety of which is hereby incorporated herein by reference thereto.

FIELD OF THE DISCLOSURE

The present invention relates to a system and method for providing secure remote transactions, in particular, to a system and method for providing authentication of remote user devices and verification of the user in order to detect and prevent fraudulent access and online transactions.

BACKGROUND

In recent years, as technology has improved to allow smartphones and other remote devices access into more and more remote applications, the use of remote transactions has increased by multiple orders of magnitude. Remote trans-actions are used in many market verticals known as eCom-merce or online access, online payments, online healthcare, online banking, online gaming and many other applications.

In the online use cases, the service provider, before providing the service requested by the user, needs to authen-ticate the device and verify the user in order to identify and stop fraudulent activities. Both authentication of the device and verification of the user have proven to be difficult to accomplish with a high success rate. In fact, only about half of the fraudulent attempts prevalent in online transactions can be blocked by current commercial systems. The remain-der of the fraud attempts are left for the service provider to pay, with those charges eventually being passed down to the user, or customer, via increases in prices for services and goods provided.

For example, current "Card Not Present" commercial fraud solution systems that are available to ecommerce or online service companies, use various types of data collec-tion and data analytics, or "Big Data Analytics." Once the analysis is completed, the algorithms used cannot determine with certainty the authentication of the device to be able to verify the user. These models assign a score to each payment transaction based on its analysis. A higher score generally indicates a higher likelihood of the transaction being suspi-cious or fraudulent, while a lower score suggests a more legitimate transaction. Unfortunately, about 50% of the fraud is not currently stopped by these existing technologies. The resultant annual losses due to fraud for "Card Not Present" remote payment transactions amounts to 10's of billions of dollars each year.

There are also ID Fraud Solutions companies which have tried to prevent digital account access through simple text messaging or two-factor authentication. These methods result in significant user friction and a substantial amount of ID fraud that is not stopped. Losses resulting from the failure to detect identity fraud also amount to 10's of billions of dollars each year.

In typical secure remote systems, user data is protected by encrypting user data, which is associated with one identifier (e.g. PAN, or the Token, or an Account Number) uniquely associated with the user, with a private key obtained from a trusted, remote authentication source, and a public key stored on the server. The user can generate a digital signature using the user's public key. The remote server can then verify the digital signature against the corresponding public key. Such identity-based encryptions can be broken in a number of ways, including by brute-force attacks on the remote authentication source. Unfortunately, the emergence of increasingly powerful Quantum Computing ("QC") will soon increase the success rate and speed of such brute-force attacks, rendering these encryption systems ineffective.

In particular, the looming threat of QC will initially make asymmetric encryption that is used in most remote authen-tication services useless, and soon after the symmetric encryption too. The power of QC will be much larger than that of classic computers and will enable the use of brute force methods to break the encrypted data at increasingly higher rates of speed.

Accordingly, there is still a need for systems and methods for providing authentication of remote user devices and verification of the user in order to enable secure remote transactions, and for detecting and preventing fraudulent access and online transactions. In particular, there is a need for systems and methods for authenticating remote transac-tions that are resistant to QC attacks, e.g., systems and methods that do not require encryption, which can be broken by QC, or keys, which are subject to theft. There is also a need for systems and methods for providing secure remote transactions that minimize user friction in the process of device authentication and user verification.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure relates to a system and methods for providing secure authentication of remote user devices and verification of the user that do not rely on encryption or keys, and which minimize user friction in the process of device authentication and user verification.

The present disclosure is directed to a method for authen-ticating a remote transaction with a requesting user request-ing remote access to services hosted on a service provider domain device, which includes an authentication domain device receiving a request for a transaction from the request-ing user for access to the services, via the service provider domain device. The request includes a user identifier asso-ciated with a registered user for the services.

The method further includes the authentication domain device associating a first modified user identifier and a first bitwise distance with the registered user. Each of the first modified user identifier and a second modified user identifier that is different from the first modified user identifier were generated in a registration process and include the user identifier obfuscated within. The first bitwise distance is generated, in the registration process, between the first modified user identifier and a modified user identifier that is based on the second modified user identifier generated in the registration process. The first modified user identifier and the first bitwise distance may be stored only in the authentic domain device and not in the registered user device, and the second modified user identifier generated in the registration process is stored only in the registered user device and not in the authentication domain device.

The method may further include sending, via the authentication domain device, a request to a user device, using registration data associated with a registered user device for the registered user, to confirm that the request from the requesting user is from the registered user, and receiving, by the authentication domain device, in a response confirming the request for the transaction from the user device, the second modified user identifier from the user device. In an authenticated remote transaction, the second modified user identifier generated in the registration process is the same as the second modified user identifier received in the response confirming the request.

After receiving the response confirming the request, the authentication domain device preferably calculates a second bitwise distance that is based on the first modified user identifier generated in the registration process, and the second modified user identifier just received in the receiving step for confirming the transaction from the user device, i.e., the second bitwise distance is between the first modified user identifier generated in the registration process, and the modified user identifier that is based on the second modified user identifier just received in the receiving step.

The first bitwise distance and the second bitwise distance are then compared by the authentication domain device, in embodiments, to identify anomalies in the second modified user identifier received in the receiving step for confirming the request for the transaction from the user device, and an authenticity of the transaction is determined, in embodiments, by the authentication domain device, based on the comparison and on a presence or absence of any anomalies. The authentication domain device may then send a code to the service provider domain device, corresponding to allowing or declining the remote transaction based on the presence or absence of anomalies, wherein the absence of anomalies corresponds to the code allowing the remote transaction, authenticating the user device as the registered user device and the requesting user as the registered user.

The method may also include returning, by the authentication domain device, to the service provider domain device, a code that terminates the remote transaction, in response to the authentication domain device receiving a denial of the request for the transaction from the registered user device, indicating that the requesting user is not the registered user.

In embodiments, the user identifier is integrated with a first random number to form the first modified user identifier and with a second random number that is different than the first random number to form the second modified user identifier in the registration process. The method may further include generating the first random number and the second random number in the registration process.

In further embodiments, the modified user identifier is the second modified user identifier generated in the registration process, and the first bitwise distance is generated, in the registration process, between the first modified user identifier and the second modified user identifier generated in the registration process from the user identifier and the first and second random number, respectively. The second bitwise distance is calculated in these embodiments as a bitwise distance between the first modified user identifier formed in the registration process, and the second modified user identifier received in the receiving step for confirming the transaction from the user device.

In other embodiments, the modified user identifier generated in the registration process is a device modified user identifier that combines the second modified user identifier and user device data associated with the registered user device. The user device data may include one or both of a user device identifier, generated and stored in the registered user device in the registration process, and user device data elements bound to the registered user device. The method may include the authentication domain device also associating the user device identifier with the registered user, wherein the first bitwise distance is calculated as the bitwise distance between the first modified user identifier and the device modified user identifier.

The user device data elements may include, but are not limited to, one or more of a software version, hardware details, or location details for the registered user device.

In additional embodiments, the response confirming the request for the transaction from the user device may further include the user device data, including the one or both of the user device identifier and the user device data elements. In the authenticated remote transaction, the user device data associated with the registered user in the registration process is the same as the user device data received in the response confirming the request for the transaction.

The device modified user identifier generated in the registration process is calculated, in embodiments, by applying an XOR operation to add the second modified user identifier generated in the registration process to the user device data from the registration process.

The calculation of the second bitwise distance may include, in embodiments, first generating an extracted modified user identifier that is based on the second modified user identifier received in the receiving step for confirming the transaction by applying the XOR operation to add the second modified user identifier and the user device data, both received in said receiving in the response confirming the request. The second bitwise distance is then calculated between the first modified user identifier generated in the registration process, and the extracted modified user identifier.

In other embodiments, the method includes the authentication domain device also associating the user device identifier with the registered user, wherein the modified user identifier generated in the registration process is a device modified user identifier that is generated by applying an XOR operation to add the second modified user identifier generated in the registration process to one of the user device identifier, generated and stored in the registered user device in the registration process, and the user device data elements bound to the registered user device. The first bitwise distance is then calculated, in embodiments, as the bitwise distance between the first modified user identifier and the one of the user device identifier and the user device data elements from the registration process, and said receiving, by the authentication domain device, in the response confirming the request for the transaction from the user device, further includes receiving the one of the user device identifier and the user device data elements, in the response. In the authenticated remote transaction, the one of the user device identifier and the user device data elements associated with the registered user in the registration process is the same as the one of the user device identifier and the user device data elements received in the response confirming the request for the transaction.

In these embodiments, calculating the second bitwise distance may further include first generating an extracted modified user identifier that is based on the second modified user identifier received in the receiving step for confirming the transaction by applying the XOR operation to add the second modified user identifier and the one of the user device identifier and the user device data elements received in said receiving in the response confirming the request. The second bitwise distance is then calculated between the first modified user identifier generated in the registration process, and the extracted modified user identifier.

In some embodiments, the method includes generating the first modified user identifier in the registration process by executing an algorithm that alternates each digit of the user number with a sequential digit of the first random number, and generating the second modified user identifier, by executing the algorithm that alternates each digit of the user number with a sequential digit of the second random number.

In other embodiments, the method includes generating the first modified user identifier in the registration process by executing an algorithm that inserts a predetermined number of sequential digits of the first random number after each sequential digit of the user identifier, and generating the second modified user identifier by executing the algorithm that inserts the predetermined number of sequential digits of the second random number after each sequential digit of the user identifier.

In still other embodiments, the method includes generating the first modified user identifier and the second modified user identifier in the registration process by executing an algorithm that concatenates the user identifier with the first random number and the second random number, respectively.

In additional embodiments, the method may further include generating a hash value for each of the first modified user identifier and the second modified user identifier.

In some embodiments, the method includes generating the first modified user identifier in the registration process by executing an algorithm that inserts a number of sequential digits of the first random number after a digit of the user identifier, wherein the number of sequential digits inserted is determined by the value of the digit, and generating the second modified user identifier by executing an algorithm that inserts a number of sequential digits of the second random number after the digit of the user identifier, wherein the number of sequential digits inserted is determined by the value of the digit.

Further embodiments of the method for authenticating a remote transaction include the authentication domain device receiving, in the response confirming the request for the transaction from the user device, each of the user device identifier and the user device data elements. The device modified user identifier is generated, in embodiments, for each of the user device identifier and the user device data elements in the registration process, and the first bitwise distance is calculated between the first modified user identifier and each of the user device identifier and the user device data elements from the registration process. In additional embodiments, the second bitwise distance is then calculated, in said calculating step, for each of the user device identifier and the user device data elements received in the response confirming the request for the transaction by first generating the extracted modified user identifier by applying the XOR operation to add the second modified user identifier to each of the user device identifier and the user device data elements received in said receiving in the response confirming the request and then calculating the second bitwise distance between the extracted modified user identifier for each of the user device identifier and the user device data elements and the first modified user identifier from the registration process.

In embodiments, the first bitwise distance is also generated, in the registration process, between the first modified user identifier and the second modified user identifier generated in the registration process, and the second bitwise distance is also calculated in said calculating step between the first modified user identifier formed in the registration process, and the second modified user identifier received in the receiving step for confirming the request for the transaction from the user device. In further embodiments of the method, the comparing the first bitwise distance and the second bitwise distance includes comparing the first bitwise distance to each of: the second bitwise distance between the first modified user identifier from the registration process and the second modified user identifier received in the receiving step for confirming the request; and the second bitwise distance between the first modified user identifier from the registration process and the extracted modified user identifier for each of the user device identifier and the user device data elements received in the response confirming the request for the transaction.

In embodiments, anomalies in the second bitwise distance between the first modified user identifier formed in the registration process, and the second modified user identifier received in the receiving step indicate the user identifier was stolen.

In further embodiments, anomalies detected in the second bitwise distance corresponding to the user device identifier may indicate the user device requesting the remote transaction is not the registered user device that the user device identifier was loaded into in the registration process. The second bitwise distance corresponding to the user device identifier is calculated in said calculating step between the first modified user identifier formed in the registration process, and the extracted modified user identifier generated by applying the XOR operation to add the second modified user identifier and the user device identifier received in said receiving in the response confirming the request.

In further embodiments, anomalies in the second bitwise distance corresponding to the user device data elements indicate a change in the user device after the registration process. The second bitwise distance corresponding to the user device data elements is calculated in said calculating step between the first modified user identifier formed in the registration process, and the extracted modified user identifier generated by applying the XOR operation to add the second modified user identifier and the user device data elements that were received in said receiving in the response confirming the request.

In further embodiments of the method, said sending, by the authentication domain device, to the service provider domain device, may include sending a fail code to the service provider domain device based on the presence of an anomaly in the second modified user identifier received in the receiving step for confirming the request for the transaction from the user device.

The method of the present disclosure may further include, in embodiments, dynamically updating at least the first modified user identifier and the first bitwise difference in said associating step, and the second modified user identifier and the user device data generated in the registration process and stored at the user device, in response to one of a lapse of a predetermined time interval, a predetermined number of fail codes received, a predetermined number of transactions, a failed authentication, and a user request.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. The drawings, like the detailed description, are exemplary and are not to be considered limiting. It is to be understood that in some instances, various aspects of the disclosure may be shown exaggerated or enlarged to facilitate understanding. The teaching of the disclosure can be readily understood by considering the following detailed description in conjunction with the accompanying drawings.

In the embodiments represented in the drawings and described herein, User Identifiers, Device Identifiers, Modified User Identifiers and so on are shown as ASCII numbers. It should be clear that these numbers may also be represented in other character codes, including but not limited to Unicode, or in binary, without departing from the scope of the present disclosure. In calculations for determining the authenticity of a transaction, certain modified user identifiers including device modified user identifiers of the present disclosure, regardless of how they are initially represents, are converted to a binary representation.

FIG. 1A is a block diagram representation of an embodiment of a system of the present disclosure.

FIG. 1B is another block diagram representation of an embodiment of a system of the present disclosure showing additional details and interfaces between the domains.

FIG. 2A is a flow chart representation of an embodiment of a method of initializing the system of FIG. 1A, and registering a user and user device via a registration process, including creating modified user identifiers based on a user identifier associated with a registered user of the system, and, in embodiments, creating a device identifier, and loading them into various domains of the system.

FIG. 2B is a flow chart representation of another embodiment of a method of initializing the system of FIG. 1A, and registering a user and user device, via the registration process.

FIG. 3A is a flow chart representation of an embodiment of a method of ascertaining the authenticity of a remote transaction including authenticating the user device (e.g., cell phone) initiating the remote transaction and verifying the requesting user before approving the remote transaction.

FIGS. 4-7 are schematic representations of different embodiment of a first modified user identifier (UAN+1) and a second modified user identifier (UAN+2) generated by executing different embodiments of an algorithm to obfuscate the user identifier therein.

FIG. 8 is a schematic representation of an embodiment of a method of generating a modified user identifier (in this case, a device modified user identifier) in accordance with FIG. 2A, that is based on the second modified user identifier generated in the registration process, and generating a first bitwise difference between the modified user identifier and the first modified user identifier generated in the registration process. The device modified user identifier in this case is generated by combining, via an XOR operation, the second modified user identifier generated in the registration process, and user device data.

FIG. 9 is a schematic representation of an embodiment of a method of determining an authenticity of a remote transaction, in accordance with FIG. 3A, based on the device modified user identifier and the first bitwise distance generated in accordance with the embodiment represented in FIG. 8, and including generating a second bitwise distance for comparison to the first bitwise distance, wherein the second bitwise distance is based on the first modified user identifier stored at the authentication domain device in the registration process, and the second modified user identifier received in the receiving step for confirming the transaction from the user device.

FIG. 10 is a schematic representation of another embodiment of a method of generating a different device modified user identifier for each of a user device identifier and user device data elements, in accordance with FIG. 2B, each of which is based on the second modified user identifier generated in the registration process, and generating a first bitwise difference between the first modified user identifier and each of the second modified user identifier and the two device modified user identifiers.

FIG. 11 is a schematic representation of another embodiment of a method of determining an authenticity of a remote transaction, in accordance with FIG. 3B, based on the device modified user identifiers and the first bitwise distance generated in accordance with the embodiment represented in FIG. 10, and including generating a second bitwise distance for comparison to the first bitwise distance, wherein the second bitwise distance is based on the first modified user identifier stored at the authentication domain device in the registration process, and the second modified user identifier received in the receiving step for confirming the transaction from the user device.

FIG. 12 is a sequence diagram representation of additional steps of the method of initializing the system of FIG. 1A, and registering a user and user device, via the registration process of FIG. 2A, 2B for accessing the services provided by the service provider in the system of FIG. 1A.

FIG. 13 is a sequence diagram representation of an authenticated remote transaction, after a user device associated with registered device data confirms the request for the remote transaction is valid.

FIG. 14 is a sequence diagram representation of a failed remote transaction, even after a user device associated with registered device data confirms the request for the remote transaction is valid, due to the registered user device being spoofed or hacked.

FIG. 15 is a sequence diagram representation of a failed remote transaction, due to a user device associated with registered device data denying the request for the remote transaction.

FIG. 16 is a detailed example of the application of the embodiment represented in FIG. 6 to generate modified user identifiers using random numbers to obfuscate the user identifier therein.

FIG. 17 is a detailed example of an embodiment of generating a device modified user identifier that incorporates user device data, both a user device identifier and user device data elements associated with a registered user device, with the second modified user identifier generated in FIG. 16, and generating the first bitwise difference in accordance with an embodiment of a registration process of FIG. 2A.

Figure 3B:
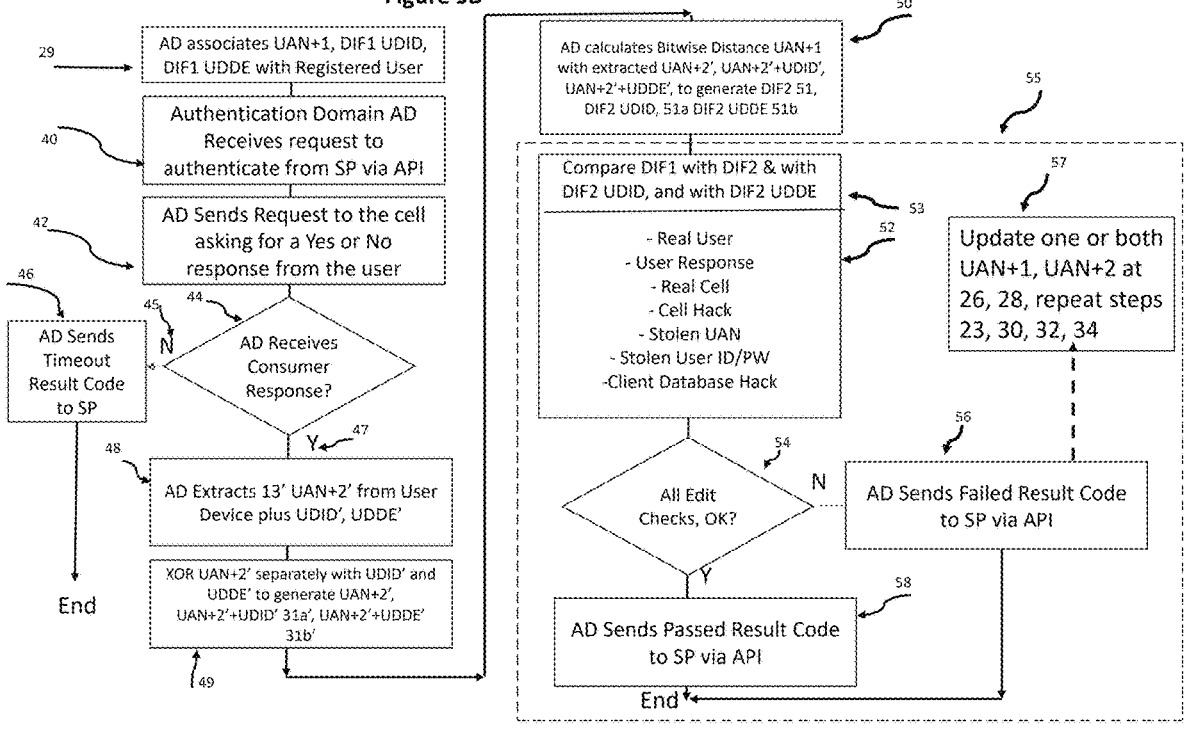
FIG. 3B is a flow chart representation of another embodiment of a method of ascertaining the authenticity of a remote transaction before approving the remote transaction.

The various aspects of the present disclosure mentioned above are described in further detail with reference to the aforementioned FIG.s and the following detailed description of exemplary embodiments.

DETAILED DESCRIPTION

The following sections describe exemplary embodiments of the present invention with reference to the accompanying drawings; however, the disclosed embodiments are merely examples of the disclosure, which may be embodied in various forms. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto.

Well-known functions or constructions and repetitive matter may not described herein in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

It should also be understood that the order of steps or order for performing certain actions is immaterial, as long as the method remains operable. Moreover, two or more steps or actions may be conducted simultaneously or concurrently, unless explicitly prohibited.

Furthermore, various embodiments may be described herein in terms of functional domains, block components, code listings, optional selections, page displays, and various processing steps. It should be appreciated that such functional domains or blocks may be realized by any number of hardware and/or software components configured to perform the specified functions.

Similarly, methods of the present disclosure may be implemented with any suitable software elements such as any programming or scripting language such as C, C++, C#, Java, COBOL, assembler, PERL, Python, PHP, or the like, with the various algorithms being implemented with any combination of data structures, objects, processes, routines or other programming elements. The object code created may be executed by any device having a data connection capable of connecting to the Internet, on a variety of operating systems including without limitation Apple OSX®, Apple IOS®, Google Android®, HP WebOS®, Linux, UNIX®, Microsoft Windows®, and/or Microsoft Windows Mobile®, Microsoft Azure, and Amazon AWS.

It should be appreciated that the particular embodiments described herein are illustrative of the disclosure and its best mode, if known, and are not intended to otherwise limit the scope of the present disclosure in any way. Examples are presented herein which may include sample data items which are intended as examples and are not to be construed as limiting. For the sake of brevity, conventional data networking, application development and other functional aspects of the systems (and components of the individual operating components of the systems) may not be described in detail herein.

Certain method steps of the present disclosure may be implemented via a computer program installed on a computer system, for example on the service provider's computer system, or on a third-party server device, on a smart card, smart phone or other mobile device, and/or via a programming application (sometimes referred to as an "app") installed on a mobile device such as a smart phone, tablet, wearable smart device or other such device, or a service, e.g., a programming application installed on a service provider system and hosted on a service provider or server device, which is accessible, for example, via a website from a computer or smart device. The programming steps for performing the methods, or for example, the functions attributed to any of the domains of the system, formed in accordance with the present disclosure may be distributed between more than one device. The computer systems and devices (e.g., smart card, mobile devices, and so on) formed in accordance with the present disclosure include a processing device, and memory for storing the processing steps that when executed by the processing device perform the method steps described herein.

In various embodiments, certain portions of the system and method of the present disclosure may take the form of an entirely software embodiment, an entirely hardware embodiment, or an embodiment combining aspects of both software and hardware. Furthermore, the present disclosure may take the form, in part, or whole, of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, portable memory or storage devices, including semiconductor devices, flash memory, USB thumb drives, SIM cards, and other portable memory chips, and/or the like. For secure storage of the authentication credentials in the user device, a digital wallet, a Secure Element and other secure storage areas may be used.

In embodiments, unless explicitly excluded, all or part of the disclosed systems and/or methods and/or steps may be provided as one or more callable modules, an application programming interface (e.g., an API), a source library, an object library, a plug-in or snap-in, a dynamic link library (e.g., DLL), or any software architecture capable of providing the functionality disclosed herein.

Computer program instructions embodying a method or method steps of the present disclosure may be stored in a computer-readable memory that can direct a computer or other programmable data processing apparatus to function in a particular manner, such that the instructions stored in the computer-readable memory produce an article of manufacture, including instruction means, that implement the function specified in the description and/or flowchart block(s). The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions or methods specified in the present disclosure.

The disclosed systems and/or methods may be embodied, at least in part, in application software that may be downloaded, in whole or in part, from either a website or an application store ("app store") to the mobile device. In another embodiment, the disclosed system and method may be included in the mobile device firmware, hardware, and/or software.

An "app" is used herein as that term is known, to refer to a software application designed to run on a mobile device, such as a mobile or smart phone, tablet, wearable smart device, or any other such mobile device known in the art.

The "XOR" operation, which may also be represented as a caret A, as referred to herein is the "exclusive OR" logical operator as used in computer programming to perform bitwise operations between each bit position of two binary numbers being compared or "added". In particular, for each bit position, a "1" is returned if the two inputs being compared are different, and a "0" is returned if the two input bits are the same. Two binary numbers may be "added" by applying the XOR operation.

The "hash" algorithm, as referred to herein, is the known mathematical function that converts a variable-length string, or number, into a unique, fixed-length string known as a "hash digest", or "hash value," which cannot be reversed to retrieve the original string or number.

The term "modified user identifier" as used herein, may refer to any modification to a user identifier to obfuscate the user identifier (which may be a user account number "UAN" in the embodiments herein), and may also incorporate user device data as described herein for certain embodiments.

In the embodiments demonstrated herein, a Bitwise Distance is calculated between certain parameters to generate, e.g., a first bitwise distance 19 and a second bitwise distance 51 of the present disclosure. The Bitwise Distance (which is referred to generally herein as "DIF", and in particular examples as "DIF1", "DIF2", "DIF1 UDID", "DIF1 UDDE", "DIF2 UDID", "DIF2 UDDE" as described further herein) as used herein may be calculated in accordance with any known algorithm, such as the Hamming Distance, which calculates the number of positions at which two strings of the same length differ. However, the methods of the present disclosure are not limited thereto. It is contemplated that any known Bitwise Distance algorithm may be used, also including, but not limited to, algorithms that calculate the Levenshtein Distance, Jaro-Winkler Distance, Manhattan Distance, Euclidean Distance, or Cosine Similarity.

It should be understood that while the embodiments are described herein primarily for the example of a user wishing to conduct online banking or to make online purchases using a user identifier, such as a User Account Number, from a remote device, the disclosure is not limited to these particular remote services. On the contrary, the methods of the present disclosure can be implemented for secure access of any type of remote access that requires authentication.

The present disclosure is directed to a system and methods for providing secure authentication of remote user devices and verification of the user that do not rely on encryption or keys, and which minimize user friction in the process of device authentication and user verification.

Figure 1B:
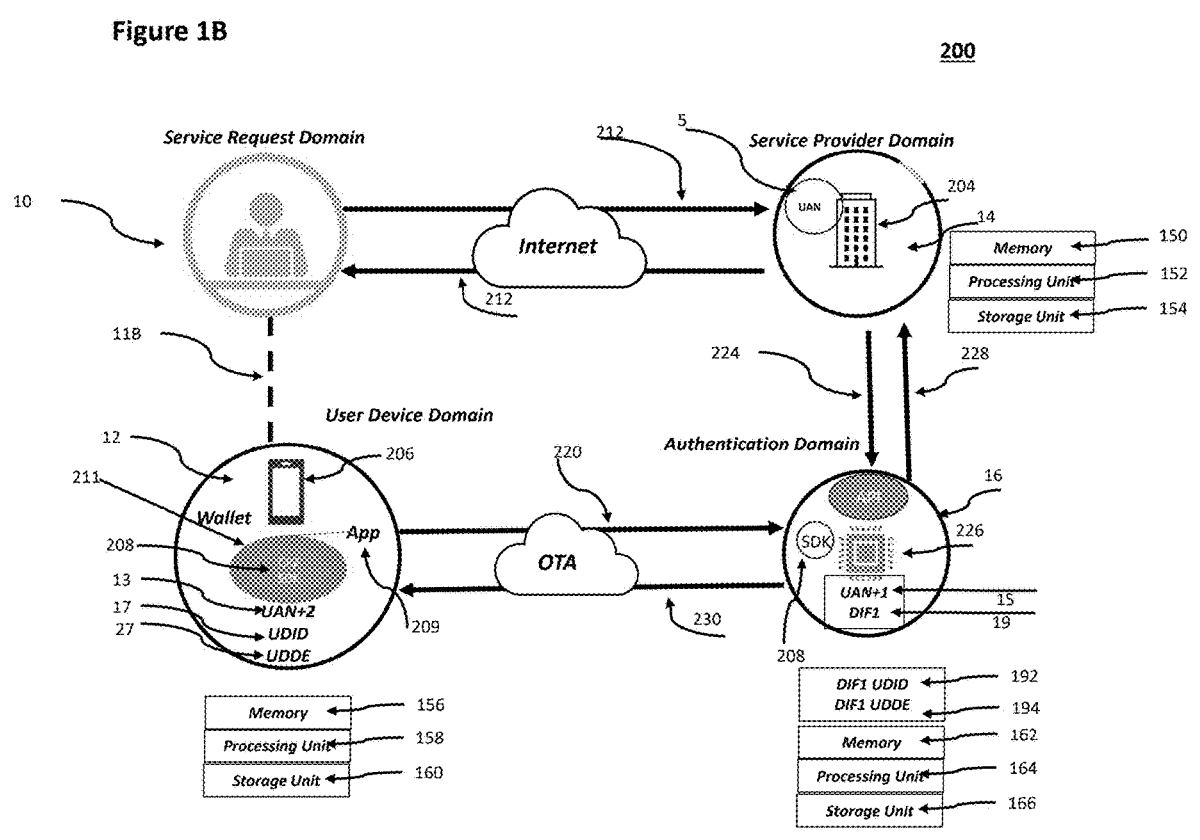

Referring to FIGS. 1A, 1B, a system 200 of the present disclosure is characterized by an architecture made up of four domains. The functionality of, and interaction between, these domains allow the authentication and verification to take place. As further described herein, the four domains are Service Request Domain 10, User Device Domain 12, Service Provider Domain 14 and Authentication Domain 16. These four domains are operably connected and configured to work together in accordance with the methods of the present disclosure, with a device in the Authentication Domain 16, or in embodiments, in the Service Provider Domain 14, initially generating different multiple identifiers associated with a registered user of the services provided by the Service Provider Domain 14 and storing them on different devices in at least two different domains. The system 200 is configured to use the multiple identifiers to provide the authentication required when a requesting user requests access, to identify fraudulent users, and to detect any fraudulent activity during the remote transaction. The multiple identifiers include at least two "modified user identifiers" and, in embodiments, may also include device identifiers. The modified user identifiers are different, but incorporate the same User Identifier 5, such as a User Account Number (UAN) as in the embodiments shown, and, in embodiments, also incorporate user device data, such as a user device identifier ("UDID") generated by the system, and, optionally, additional device data elements fixedly associated with a user device ("UDDE").

A User Identifier 5 is referred to in the embodiments as "UAN" for shorthand, although it is understood that the User Identifier may be any user identifier. A first, or second "modified user identifier" that is generated by executing an algorithm that combines the UAN with a random number, is referred to as "UAN+", or specifically, "UAN+1" for first modified user identifier 15 and "UAN+2" for second modified user identifier 13. If user device data 7 are integrated with the second modified user identifier, a new modified user identifier is generated, which is referred to in particular embodiments as a device modified user identifier is generated and referred to, depending on how the user device data are integrated with the User Identifier 5 as "UAN+2+DE", "UAN+2+UDID", or "UAN+2+UDDE", for example. The "+" does not refer to any particular calculation, when used in this way, but only to indicate integration in some way of the UAN with random numbers (UAN+1 or UAN+2) and then integration of UAN+2 with one or more device elements.

As used herein, the term "domain" refers to one or more connected processors or computers configured to operate in accordance with a set of instructions stored therein to carry out specific functions and/or control of a system of the present disclosure, as described herein. The four domains, as described further herein, cooperate to enable and complete the authentication. Accordingly, each domain includes a device configured with hardware and/or software configured to perform the specific function as described herein, and which is operably connected to devices in the other domains in accordance with the present disclosure. As referred to herein, a "device" in a domain is not limited to a stand-alone computer unit or processing unit, but may include any number of such units operably connected and configured to perform a specific function. Each device in a domain includes a processing unit, which may include one or more connected processors, a storage unit with memory, including computer readable memory with instructions stored thereon, which are accessible by the processing unit, and interfaces for communicating with other domains. Each processing unit (also referred to herein as simply processor) is configured to execute the stored instructions, which are configured such that when executed, cause the processor to implement the steps of the methods described herein. The storage unit of a domain may be comprised of multiple, operably connected storage devices in one or multiple locations. The device in each domain also includes interfaces configured to operably communicate remotely with the other devices of the other domains.

The term "registered user" as used herein is a user who has registered with the service provider, and is associated with a user identifier 5, such as a User Account Number (UAN) associated with the remote services, as used in the embodiments described herein, and with a "registered user device." The term "requesting user" 11 (FIGS. 1A, 1B) as used herein refers to a user who is requesting a remote transaction and access to the remote services. The requesting user 11 may, or may not be, the registered user associated with the user identifier 5. In an authenticated remote transaction, the requesting user is the registered user.

Referring still to FIGS. 1A, 1B, an embodiment of the Service Request Domain 10 of the system 200 includes a Service Request Domain device 202 via which a requesting user 11 may initiate a request for access to a remote service hosted by a service provider via a Service Provider Domain device 204, e.g., a server. The Service Request Domain device 202 operated by the requesting user 11 may be, for example, a computer PC, laptop, kiosk, tablet, mobile phone, or any other device in the Service Request Domain 10 that may be connected to the internet. Since the requesting users 11 are remotely accessing the Service Provider Domain device 204, each requesting user 11 has to prove to the service provider that the requesting user 11 is the "authentic" or registered user by authenticating the requesting user 11 to the Service Provider Domain device 204. If the requesting user 11 is verified as the registered user, then the Service Request Domain Device 202 may be same as User Device 206 in a remote transaction.

The Service Request Domain device 202 may include a user interface 210, which may include, e.g., a display unit 205, and a data entry unit 207 such as a keyboard. The display unit 205 preferably shows the functions available to the requesting user 11 for the application and services presented by the Service Provider Domain 14, such as online, or digital banking, payment authentication via a merchant website, or other applications. In addition to the user interface 210, an Internet Interface 212 with the Service Provider Domain 14 allows the requesting user 11, via the Service Request Domain device 202, to request the service or application provided by the Service Provider Domain 14. The internet interface 212 is also configured to access the services being requested, which are generally provided via a website, via an internet connection with the Service Provider Domain 14.

In conventional systems, remote access to the services or application hosted by the Service Provider Domain device 204 is gained by authenticating the requesting user 11, using a user identifier 5, which may be any identifying information known in the art that is uniquely associated with a user, such as a login ID or user account number, payment card number, bank account number, health insurance membership number, and so on, together with a Password, biometrics, or other known techniques. As described further herein, methods in accordance with the present disclosure generate multiple identifiers, including what is referred to herein as "modified user identifiers," which are based on a user identifier 5, such as a User Account Number ("UAN") 5 in the examples provided herein (see FIG. 4, for example, wherein the UAN is mixed with a random number), but which may be also be, but is not limited to, a login ID, payment or bank card number, membership number, or biometric data associated with the registered user. Methods of the present disclosure may include generating a user device identifier for storing with the device of the registered user, referred to herein as the "registered user device," which may also be incorporated into the modified user identifiers, in embodiments, and which must then additionally be verified as a part of authentication methods of the present disclosure.

Referring still to FIGS. 1A, 1B, the User Device Domain 12 in the system 200 provides an interface between the Authentication Domain and the User Device. It collects the user action on the User Device and sends back this information to the Authentication Domain. The User Device 206 preferably includes a display 216 and a data entry unit 218, and preferably includes a processing device 158, storage 160, and memory 156 for storing the processing steps that when executed by the processing device 158 perform the method steps described herein. The User Device 206, in embodiments, may be a mobile device, such as a cell phone, a smartphone, or a tablet, or any other device that can be configured to provide identifying data associated with the registered user held in its hardware (for a smart phone, this could be the Secure Element hardware, for example, embedded in the device, or host card emulation), which may be used to verify a requesting user 11 and to provide authentication information to the Authentication Domain 16 for the Service Provider.

The User Device 206 preferably includes two interfaces: a) a user interface 214, which preferably includes the display 216 where messages that are received are displayed to the user, and the data entry unit 218, such as a virtual keyboard, and/or audio unit, and so on, configured to allow a user of the User Device 206 to respond to, or initiate, messages; and b) a communications interface or link 220 with the Authentication Device 226, typically via an over the cellular mobile network, also called "Over The Air". This communications link 220 carries messages from the Authentication Domain 16 to the user device 206 and carries responses from the user device 206 in the User Device Domain 12 to the Authentication Domain. 16. The responses from the user device 206 are generated by entry via the user interface 214 to the user device 206. As further described herein, the response message from the user device to the Authentication Domain 16, in embodiments, may also carry other data obtained from the user device 206.

Still referring to FIGS. 1A, 1B, a requesting user 11 requesting communication via the User Device 206 with the Service Provider Domain 14 may need to install a software application on the User Device 206, commonly referred to as an "App," 209 in order to be able to communicate with the Service Provider Domain 14 and with the Authentication Domain 16 to authenticate remote transactions, as described further herein in reference to FIG. 12. The App 209 on the user device 206 may also store one of the modified user identifiers formed in accordance with the present disclosure in, for example, a digital wallet 211 of the User Device 206. A user device identifier (referred to herein as "UDID") supplied by the Service Provider may also be stored on the User Device associated with a registered user and may, in embodiments, be incorporated into the modified user identifier stored on the User Device 206 of a registered user. In further embodiments, additional user device data elements ("UDDE") that are fixed to the User Device may also be incorporated into the modified user identifier stored on the User Device 206. The UDDE may include, e.g., fixed data that is bound to the user device, such as its software version, information about its hardware, and/or its location. The App 209 on the user device 206 may be developed in the Authentication Domain 16 and offered to the User Device Domain device 206 via the Service Provider Domain 14.

Referring again to FIG. 1A, in embodiments, the Service Provider Domain 14 of the system 200 is configured to provide an online presence, generally via a website remotely accessible via the internet, and to provide services to remote users. The Service Provider Domain Device 204 may include a processing unit 152, storage 154, and memory 150 for storing the processing steps that when executed by the processing device 152 perform the method steps described herein. The Service Provider Domain 14 may include operational interfaces that are run according to the software application developed for the Service Provider Domain's business requirements. The Service Provider, via the service provider domain device 204, also referred to herein as the "server," ascertains the authenticity of requesting users 11 requesting access to the services in accordance with the methods of the present disclosure before granting access to the services to the requesting user 11. The Service Provider Domain 14 includes two interfaces: a) an internet interface 222 that enables communication with the Service Request Domain 10 and with registered users, and b) an interface 224 with the Authentication Domain 16, such as an application programming interface, "API," that is configured to allow the Service Provider Domain 14 to send and receive messages to/from the Authentication Domain 16. Once the Service Provider Domain 14 has received a request from the requesting user 11 in the Service Request Domain 10 it authenticates the request by sending an Authentication Request message, through its interface 224 to the Authentication Domain 16. The interface 224 may be an API, or in embodiments in which the Authentication Domain 16 and device 226 are resident in the service provider domain 14, the interface 224 may be another suitable interface, such as a hardware interface. The Authentication Domain's response will enable the Service Provider Domain to make a decision on the authenticity of the requesting user 11, in accordance with the methods of the present disclosure.

The Authentication Domain 16 in embodiments of the system 200 communicates both with the Service Provider 14, and with the User Device Domain 12. The functionality of the Authentication Domain 16 in a remote transaction is to provide Authentication of service access requests received by the Service Provider Domain 14 from the Service Request Domain 10, by contacting the User Device Domain 12 for confirmation, to receive or extract other data from the User Device 206 required to do the authentication processing, and to inform the Service Provider Domain of the result of the authentication.

The Authentication Domain 16 includes Authentication Domain Device 226, which includes a processing unit 164, storage 166, and memory 162 with processing steps, or software, stored therein, that when executed by the processing device 152 perform the method steps described herein. The Authentication Domain Device 226 is configured specifically to implement particular functions described herein. For example, the Authentication Domain Device 226 may be configured, in embodiments, to create and/or manage user device identifiers (UDID) and additional user device data elements (UDDE) associated with a User Device 206 that is registered, as well as modified user identifiers associated with a registered user. The Authentication Domain Device 226 is also configured, in embodiments, to process and analyse the authentication requested for a remote transaction to detect any anomalies, and to confirm or deny the authenticity of the requested remote transaction based on the analysis. The Authentication Domain 16 preferably includes two interfaces: a) Interface 228 to the Service Provider Domain, and b) Interface 230 to the user device 206, e.g., a mobile device, or any other user device with internet access, at the User Device Domain 12, via a cellular mobile network, or Over the Air link. The Over the Air (OTA) link between the user device 206 and the Authentication Device 226 reduces further any need to change the regular messaging between the different domains. The Interface 228 to the Service Provide Domain may be an API, for example. In embodiments, the Authentication Device 226, may reside in the Service Provider domain 14, and be a component of the service provider domain device 204. In this embodiment, the interface 228 may be a hardware interface.

The Authentication Domain 16, via the Authentication Device 226, is configured to receive Authentication Requests from the Service Provider domain device 204, and to then send a request to the User Device 206 associated with a registered user over the cellular mobile network via the interface 230, requesting the registered user's approval. Once User Device 206 has responded to the authentication request via the User Interface 214, the App within the User Device Domain 12, in embodiments, sends a response message over the cellular mobile network to the Authentication Domain 16. This message may include, but is not limited to, the (second) modified user identifier that is stored in the User Device Domain 12 in accordance with the methods of the present disclosure. In further embodiments described herein, the Authentication Domain 16 may require additional user device identifying data from the User Device Domain 12 about its hardware and software to authenticate the device. This information is then processed and analysed by the Authentication Domain, in accordance with the methods of the present disclosure, to determine the authenticity of the User Device 206.

The multiple identifiers of the present disclosure are initially generated and stored in different domain devices, as described herein, as part of a registration process, which may be initiated by a user registering for access to the services provided by the Service Provider. During a remote transaction, the modified user identifiers and, in embodiments, user device identifiers, that were created and saved in the appropriate domain via the registration process, are implemented by the Authentication Domain to define with certainty the validity of the remote transaction requested by a user. The modified user identifiers, and/or user device identifiers (UDID) in embodiments, may also be updated on the User Device associated with a registered user, and at the Authentication Domain and/or Service Provider periodically, or on an as needed basis, as further described herein.

Referring to FIG. 1B, together with FIG. 12, embodiments of a registration process 18 described in reference to FIGS. 2A, 2B may include an on-boarding or initialization process (FIG. 12), by which an SDK (Software Development Kit) 208 (FIG. 1B) that is created by the Service Provider, or by an Authentication Domain Device that is associated therewith, and which is used to generate an app 209 (FIG. 12B), is provided, at 248, to a ("registered") user device 245. Referring to FIG. 12, the Service Provider initially creates a request, at 240, to the Authentication Domain Device 226, to register a requesting user 11 for accessing their services, which includes a User Identifier 5 associated with the registered user, and registration data, including a cell phone number or other communication data associated with the registered user device 245.

The Authentication Domain Device 226 then requests, at 242, and receives, at 244, confirmation that the registered user is associated with the registered user device 245, via the cell phone number, and may also extract, at 244 (referring also to FIGS. 2A, 2B, at 24), user device data elements 27 (see FIG. 1A), such as a software version, hardware information, and so on. The Authentication Domain Device 226 then generates, at 246, in accordance with the embodiments described herein, the modified user identifiers, device identifiers, and bitwise difference based on the User Identifier 5, the registered user information, and any other data necessary for the authentication process. The Authentication Domain Device 226 then embeds the SDK with the requisite information, and forwards it to the Service Provider Domain Device 204, at 246. The SDK and/or app 209, which may be provided in a digital wallet 211, is then loaded, at 248, in embodiments, via the Service Provider Domain Device 204, with the appropriate identifiers in accordance with the methods of the present disclosure, into the Registered User Device 245, for use in enabling the remote transactions. In embodiments, one of the modified user identifiers 13 (referred to herein as "UAN+2") generated in accordance with the methods described herein, and in embodiments, a device identifier 17 (referred to herein as "UDID") as described herein are loaded into the digital wallet 211 of the User Device 206 and are accessed by the app 209, together with, in embodiments, user device data elements ("UDDE") 27 that are bound to the User Device 206, in the authentication process for remote transactions, as described herein.

It should be understood that a user must be registered with the service provider 204 in order to be approved and authenticated for remote transactions. As part of this registration process, therefore, registered data for communicating with the registered user device 245, referring for example to FIG. 12, may be gathered and stored, at 244, by the Service Provider Domain Device 204 with the User Identifier 5, e.g., a User Account Number (UAN) assigned to the registered user. For example, a cell phone number and/or email address for the registered user may be stored. Communications may also occur during sign-on for conducting remote transactions via push notifications to the app that was downloaded to the registered user's phone during the registration process.

FIGS. 2A and 2B are representative flow charts depicting embodiments of a process 18 for registering a user with the service provider to enable remote transactions in accordance with the methods of the present disclosure. The registration may be provided, in part, or in whole, via the same Authentication Domain Device 226 that authenticates the remote transactions, or in embodiments, the registration may be provided, in part, or in whole, by a third-party service, or by the Service Provider Domain Device 204. Data may then be provided to the Authentication Domain Device 226, which is needed to authenticate a remote transaction for a registered user, and which is associated with (see FIG. 3A, 3B, associating step, 29) a registered user and registered user device. For the authentication process, referring to FIGS. 3A and 3B, the data that Authentication Domain Device 226 associates, at 29, with the registered user and registered user device, includes, in embodiments, registration data needed to communicate with the registered user and the registered user device, a modified user identifier (a first modified user identifier, "UAN+1" 15) that is based on the registered user's User Identifier 5, e.g., a UAN 5, and which is created in the registration process 18 (see FIGS. 2A, 2B, at 28) and the first bitwise distance 19 DIF1, as defined herein, which is created in an embodiment of the registration process 18 (see FIGS. 2A, 2B, at 30).

The authentication methods of the present disclosure utilize modified user identifiers that include, in an obfuscated form, the User Identifier 5 associated with a registered user, and in additional embodiments, described in reference to FIGS. 2B, 3B, and FIG. 2A, 3A, also include the use of device identifiers. These modified user identifiers are created prior to the remote transaction, for example, in accordance with the registration processes of FIGS. 2A, 2B. Referring to FIG. 2A and FIG. 2B, for example, the registration process 18 includes, in embodiments, generating, at 26, 28, by an Authentication Domain Device 226, in a registration process 18 initiated, at 20, for example, by the Service Provider Domain Device 204, a first modified user identifier 15, and a second modified user identifier 13 that is different than the first modified user identifier 15, but which are related by the user identifier 5. The first modified user identifier 15 and the second modified user identifier 13 are generated, at 26, 28, in embodiments, by executing an algorithm that obfuscates the user identifier 5 within each of the first modified user identifier 15, and the second modified user identifier 13.

In embodiments, for obscuring the user identifier 5 in the first modified user identifier 15 and the second modified user identifier 13, two random numbers 62, 70, for example (see FIG. 4), also referred to herein as "RN1" and "RN2," respectively, are first generated, at 21, wherein RN1 and RN2 are different random numbers. An algorithm is then executed, at 28, 26, that incorporates the user identifier 5 into RN1 62 and RN2 70, respectively, to obfuscate the user identifier 5 within each of the first modified user identifier 15 and the second modified user identifier 13, respectively. Embodiments of the algorithm for incorporating the user identifier 5 into RN1 and RN2 to obfuscate the user identifier 5 therein, are discussed further herein in reference to FIGS. 4-7.

Referring still to FIGS. 2A and 2B, the method may further include storing, at 34, by the Authentication Domain Device 226, the second modified user identifier 13 only in a registered user device associated with the registered user and not at the authentication domain device 226, and storing, at 32, by the Authentication Domain Device 226, the first modified user identifier 15 and the first bitwise distance 19 in the Authentication Domain Device 226, in association with the registered user and not in the registered user device.

The method of the present disclosure, may also include calculating, at 30, by the Authentication Domain Device 226, the first bitwise distance 19 (also referred to herein as "DIF1" 19), as the bitwise distance between the first modified user identifier 15 and a modified user identifier 33 that is based on the second modified user identifier 13 generated in the registration process.

In embodiments, the modified user identifier 33 is the second modified user identifier 13 generated in the registration process.

In other embodiments described herein, the modified user identifier 33 is a device modified user identifier 31 that is based on the second modified user identifier 13 generated in the registration process, and which further incorporates user device data 7. The user device data 7 may be incorporated in different ways into the second modified user identifier 13 generated in the registration process in accordance with the embodiments of FIGS. 2A, 2B to generate the device modified user identifier 31. In embodiments, as exemplified in FIG. 2B, at step 30, a different device modified user identifier 31 may be generated by incorporating each of the user device identifier UDID 17 and the user device data elements 27 UDDE into the second modified user identifier 13 to generate device modified user identifiers 31*a*, 31*b*, as described further herein.

Referring now to FIGS. 3A, 3B, embodiments of a method for authenticating the remote transaction include receiving, at 40, by the Authentication Domain Device 226, via the Service Provider Domain Device 204, a request for a transaction from the requesting user 11 for access to the services. The request includes the user identifier 5 associated with the registered user for the services. The method may further include sending, at 42, via the Authentication Domain Device 226, a request to a user device purporting to be the registered user device associated with the registered user to confirm the request from the requesting user.

In embodiments, the request is sent, at 42, to the user device of the requesting user 11 using registration data associated with the registered user device that was gathered during the registration process. For example, a cell phone number for the registered user may be used, or a push notification may be sent to the app that was downloaded to the registered user's phone during the registration process.

Ideally the user device is the registered device such that a response, at 44, from the user device can be trusted. As will be further understood from the FIG.s and following discussion, embodiments of the methods of the present disclosure also enable identification of fraudulent transactions resulting from the registered user's phone being stolen, hijacked, or spoofed, and/or the app and user identifiers being stolen.

The method may include returning, at 46, by the Authentication Domain Device 226, to the Service Provider Domain Device 204, a code that terminates the remote transaction, such as a timeout code, in response to the authentication domain device 226 receiving a denial, at 44, 45, of the request for the transaction from the registered user device. In this case, it is clear that the user device is not the registered user's device and the request is fraudulent, indicating that the User Identifier, e.g., User Account Number (UAN) and password were stolen.

Still referring, for example, to FIG. 3A or 3B, a Yes 47 or No 45 response is received, by the Authentication Domain Device 226, at 44, to the request sent, at 42. The method further includes, in embodiments, receiving, at 48, by the Authentication Domain Device 226, in a response confirming the request (responding Yes 47) for the transaction from the user device, 44, 47, the second modified user identifier 13' from the user device. In further embodiments, the Yes 47 response must be received within a predetermined period of time, or a fail, timeout code is generated, at 46, and forwarded to the Service Provider Domain Device 204. The Yes response 47 may be sent together with the second modified user identifier 13', in embodiments, via the App 209 on the user device for accessing the remote services.

The method also includes, in embodiments, calculating, at 50, by the Authentication Domain Device 226, a second bitwise distance 51 (also referred to herein as "DIF2" 51) that is based on, or calculated from, the first modified user identifier 15 stored at the Authentication Domain Device 226, and the second modified user identifier 13' (also referred to herein as "UAN+2'") just received in the receiving step, at 48, for confirming the transaction from the user device. In particular, the second bitwise distance 51 is calculated, in embodiments, between the first modified user identifier 15 generated in the registration process, and a modified user identifier 33' (also referred to herein in embodiments as "extracted modified user identifier" 33')

that is based on the second modified user identifier 13' just received in the receiving step, a 48.

Referring to FIG. 3A, for example, in an embodiment that does not incorporate device data in the authentication analysis, the modified user identifier that is based on the second modified user identifier 13' is the second modified user identifier 13'. In this case, the second bitwise distance 51 is calculated, at 50, as the bitwise difference between the first modified user identifier 15 stored at the Authentication Domain Device 226, and the second modified user identifier 13' (also referred to herein as "UAN+2'") just received in the receiving step, at 48.

In other embodiments described further herein, still referring to FIG. 3A, 3B, the second bitwise distance 51 is calculated, at 50, as the bitwise difference between the first modified user identifier 15 stored at the Authentication Domain Device 226 and the modified user identifier 33' or extracted modified user identifier" 33' that is based on the second modified user identifier 13' just received, at 48. In these embodiments, device data is also extracted, at 48, from the user device, and the modified, or extracted, user identifier 33' incorporates the second modified user identifier 13' just received, at 48, with the device data extracted, at 48.

Embodiments of the method may further include comparing, at 53, by the Authentication Domain Device 226, the first bitwise distance 19 and the second bitwise distance 51, formed in accordance with any of the embodiments, to identify anomalies in the second modified user identifier 13' received in the receiving step, at 48. If the first bitwise distance 19 and the second bitwise distance 51 are the same, then the user device from which the second modified user identifier 13' was received, at 48, is assumed to be the Registered user device, and the response is deemed valid.

Still referring to the embodiments illustrated in FIGS. 3A and 3B, the method further includes determining, at 55, an authenticity of the transaction based on a presence or absence of said anomalies. The Authentication Domain Device 226 then preferably sends a pass code, at 58, or a fail code, at 56, to the Service Provider Domain, via, for example, an API. The pass or fail code corresponds to allowing or declining the remote transaction, respectively, which is based on checking, at 52, 54, the presence or absence of said anomalies. The absence of anomalies authenticates the user device to the Service Provider, at 58, as the registered user device and the requesting user as the registered user.

For additional security, either the Service Provider or the Authentication Domain may also be configured to proactively, or dynamically change or update, at 57, one or both of the first modified and second modified user identifier, in embodiments, in response to, for example, an event, which may be a predetermined automated event, such as a lapse of a predetermined time interval or a predetermined number of fail codes received, a Transaction Volume (updates UAN+s after 'x' transactions), a failed authentication, at 56, or an on-demand event, such as a user request, and repeat the steps of the registration process to regenerate and store the required modified user identifiers, device modified identifier and bitwise distances to the appropriate devices. The updates can be made, in embodiments, by first generating new random numbers to generate an updated first 15 and second modified user identifier 13. In embodiments, in the event one of the two modified user identifiers has been determined to have been hacked, in embodiments, the Authentication Domain, in embodiments, will immediately replace the hacked modified user identifier, or both of the two modified user identifiers, and calculate and store a new difference, e.g., a Bitwise Distance number, such that the stolen modified user identifier cannot be used to successfully obtain the user's data or identity.

FIGS. 13-15 are sequence diagram representations of the steps through certain remote transaction authentication scenarios. FIG. 13 represents an authenticated remote transaction, after a user device associated with registered device data confirms the request for the remote transaction is valid. FIG. 14 represents the steps in a failed authentication that may occur, even after a user device associated with registered device data confirms, at 47, the request for the remote transaction is valid, due to the registered user device being spoofed or hacked. FIG. 15 represents the steps in a failed remote transaction, due to a user device associated with registered device data denying the request for the remote transaction.

In embodiments, as described herein, each of the first 15 and the second modified user identifier 13 generated in the registration process 18 is based on a first 62 and second random number 70, respectively, which are different from each other. The same user identifier 5, e.g., the user's User Account Number (UAN), is mixed with each of the first 62 and second random number 70 to obfuscate the UAN 5, for example, therein, in accordance with an algorithm so that the first and the second modified user identifiers are different, (referred to herein as "UAN+1" 15 and UAN+2" 13, respectively) but related by the user identifier 5. Accordingly, the first 15 and second modified user identifier 13 of the present disclosure are related to each other, in that they are both inked, shaded, or watermarked with the same user identifier 5, e.g., a UAN. The common watermark (user identifier 5) associated with a registered user of the remote services, is then used to indicate, in an authenticated transaction, that the two modified user identifiers, one stored at the Authentication Domain Device and the other stored at the registered user device are from the same user with the same user identifier 5. The original user identifier, e.g., UAN 5 can only be obtained from the first (UAN+1) 15 and second modified user identifier (UAN+2) 13 numbers in which they are hidden, using the appropriate algorithm by which they were generated. Different methods of mixing the UAN within a random number to obfuscate the UAN therein may be used, including, but not limited to, the algorithms described herein in reference to FIGS. 4-7.

As one of skill in the art will recognize, unlike the use of identifiers in the prior art for verifying a user and authenticating user data, in the present system and methods, the user identifier 5 is used to watermark two separate modified user identifiers, 13, 15, by weaving, in accordance with the various methods described herein, the user identifier 5 (e.g., a UAN) with a random number. Each of these modified user identifiers 13, 15 is stored in a separate device, one on the user side, and one on the server/authentication side of the remote transactions. The authentication process requires confirmation that both of the modified user identifiers are intact and contain the UAN watermark.

In embodiments described herein, there are two modified user identifiers per user identifier 5, each of which is stored in a separate device, one in the user device, and one in the Authentic Domain Device 226. In further embodiments as described herein, the user device identifier 17 (UDID), as well as the device modified user identifier 31 (FIG. 2A), or multiple device modified user identifiers 31*a*, 31*b* (FIG. 2B), referred to herein at steps 23, 25, are used in the authentication process. It is contemplated that further embodiments within the scope of the invention may include even more modified user identifiers and/or device identifiers in accordance with the methods of the present disclosure.

The method for authenticating a remote transaction in accordance with the present disclosure may be used with the first modified user identifier 15 (UAN+1) and second modified user identifier 13 (UAN+2) generated in accordance with any algorithm that obfuscates the UAN 5 therein to further produce the device modified user identifiers described herein. In preferred embodiments, as described herein, a number of different algorithms that weave two different random numbers into the modified user identifiers in different ways may be used.

Random numbers may be obtained for implementation with the methods of the present disclosure, in embodiments, through known commercial software packages, and may be generated within the system, or may be requested online, for example. In embodiments, a request is made via the interface from the authentication domain device 226 to the commercial software application, and the random number RN1, and then RN2, is returned.

In other embodiments, for a more robust random number, the random numbers used may be quantum random numbers (QRN), which are more secure. QRN are offered by a number of commercial vendors and are based on some quantum physic phenomenon. They are based on a hardware component that can interface, in embodiments, with the authentication domain device 226. A request message is sent via the interface provided from the authentication domain device 226 to the commercial software application and a random number RN1, and then RN2, is generated and returned.

The first modified user identifier 15 (UAN+1) and second modified user identifier 13 (UAN+2) of the present disclosure may be generated from the user identifier 5, represented as a User Account Number (UAN) in the embodiments shown in FIGS. 4-7, and, in embodiments, from the first random number RN1 62 and the second random number RN2 70, respectively, in accordance with an algorithm, to obfuscate the user identifier 5 within the first 15 and second modified user identifier 15. For example, in FIG. 4, the algorithm, when executed, at 28, in the registration process 18 (FIGS. 2A, 2B), concatenates the user identifier 5 (UAN) 5 with the random number RN1 62 and, in embodiments, also applies a hash algorithm to generate a hash value 64 to keep this data element secure.

Similarly, the algorithm, when executed, at 26, in the registration process 18 (FIGS. 2A, 2B), concatenates the user identifier 5 (UAN) 5 with the random number RN2 70 and, in embodiments, also applies a hash algorithm to generate a hash value 68 to keep this data element secure.

Figure 4:
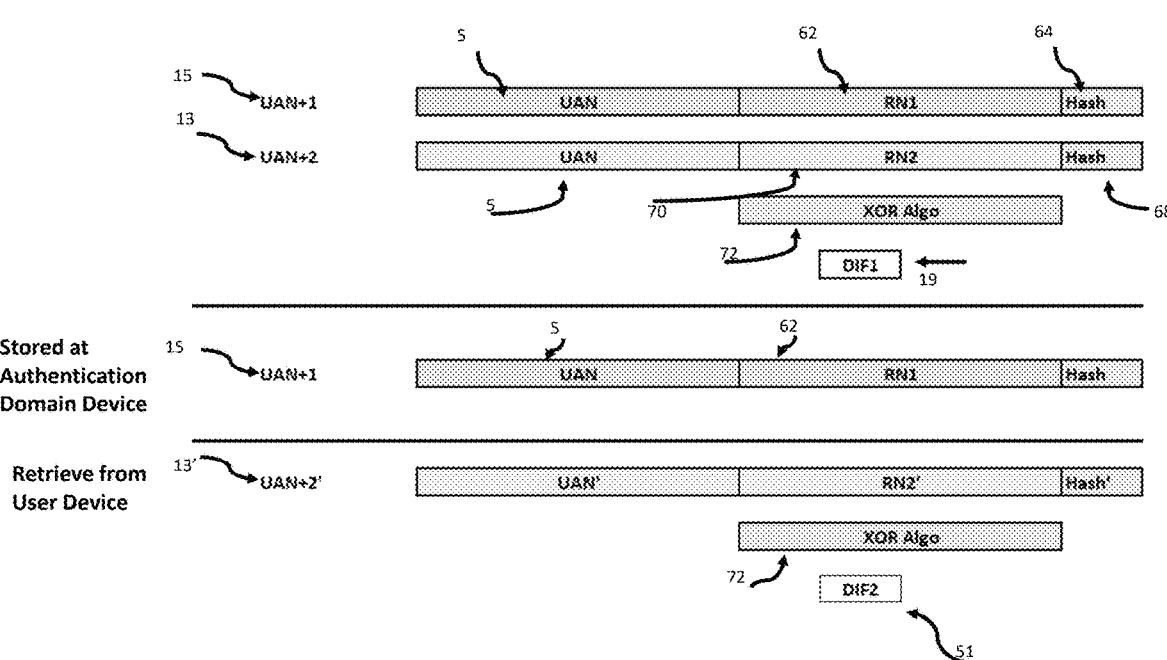

One of the embodiments described herein, wherein device data (UDID, UDDE, for example) are not utilized in the authentication process, is described further in reference also to FIG. 4 as follows. In this case, referring to FIG. 2A, the first bitwise distance DIF1 19, referred to as DIF1 73 in the example represented in FIG. 4, may be calculated, at 30, as the bitwise distance between the first modified user identifier 15 (UAN+1) and the second modified user identifier 13 (UAN+2). Referring also to FIG. 4, DIF1 73 and the first modified user identifier 15 (UAN+1), as generated in accordance with the algorithm represented in FIG. 4, are stored, at 32, in the registration process 18 with the Authentication Domain Device 226; and the second modified user identifier 13 (UAN+2), as generated in accordance with the algorithm represented in FIG. 4, is stored, at 34, in the registered user device.

Referring to FIG. 3A, as well as FIG. 4, in the authentication of a remote transaction, the Authentication Domain Device 226 receives, at 40, a request to authenticate the requesting user 11 from the Service Provider Domain Device 204. The Authentication Domain Device 226 then sends, at 42, in embodiments, a request to a user device presumed to be the registered user device associated with the requesting user 11, using registration data (for example, cell phone number) that associates the requesting user 11 to the registered user, to confirm (or deny) that the request for a remote transaction from the requesting user, is from the registered user. The Authentication Domain Device 226 may then receive, at 48, in a response from the user device confirming that the request (responding Yes 47) came from a registered user device, the second modified user identifier 13' (UAN+2') from the user device. The Authentication Domain Device 226, then generates, at 50, a new bitwise distance, referred to as the second bitwise distance 51 (DIF 2) based on the first modified user identifier 15 (UAN+1) stored, at 32, (FIGS. 2A, 2B) at the Authentication Domain Device 226, and the second modified user identifier 13' (UAN+2') received, at 48, from the user device (purported to be the registered user device).

In embodiments, the second bitwise difference 51 (DIF2), represented as DIF2 84 in the specific embodiment shown in FIG. 4, is then generated, at 50, by calculating the bitwise distance between the first modified user identifier (UAN+1) 15, stored during the registration process, and the second modified user identifier 13' (UAN+2'), received (or extracted), at 48, from the user device requiring authentication. The first bitwise distance 19 DIF1 (referred to as DIF1 73 in the specific embodiment represented in FIG. 4) and the second bitwise distance 51 DIF2 (referred to as DIF2 84 in the specific embodiment shown in FIG. 4) are then compared, at 53, and further analyzed, at 55, by the Authentication Domain Device 226 to identify anomalies in the second modified user identifier 13' received in the receiving step, at 48, from the user device.

Figure 5:
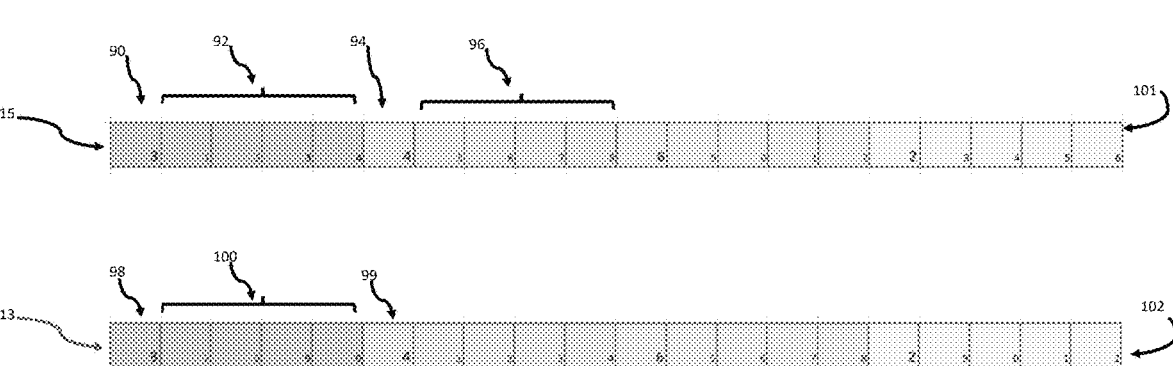

Another example of embodiments of the first modified user identifier 15 (UAN+1) and the second modified user identifier 13 (UAN+2) generated by executing, at 28, a different algorithm to obfuscate the user identifier 5 (UAN) therein is represented in FIG. 5. In this embodiment, in the registration process, the first RN1 62 and the second random number RN2 70 are first generated for use in obfuscating the UAN 5 in each of the first 13 and second modified user identifier 13 (UAN+2), respectively, and are mixed with the UAN 5 as follows. The first modified user identifier 15 may include a first digit 90 of the UAN 5, followed by a first four digits 92 of the random number, which are inserted into the UAN 5, in accordance with the algorithm, after the first digit 90 and the second four digits 96 are inserted after a second digit 94 of the UAN 5 for every digit of the UAN 5. A length of the UAN 5 determines a length 101 of the first modified user identifier 15 (UAN+1). The algorithm inserts a predetermined number of digits 92, 96, of the first random number RN1 62, taken in sequential order of digits from the first random number RN1 62, after each of the sequentially ordered digits 90, 94, for example, of the UAN 5.

Likewise, executing the algorithm, at 26, in embodiments, generates the second modified user identifier (UAN+2) 13, using the same UAN 5 and a different random number, RN2 70, by inserting a predetermined number of digits 100 of the second random number RN2 70, taken in sequential order of digits from the second random number RN2 70, after each of the sequentially ordered digits 98, 99, for example, of the UAN 5. A length of the UAN 5 determines a length 102 of the second modified user identifier 13 (UAN+2).

Figure 6:
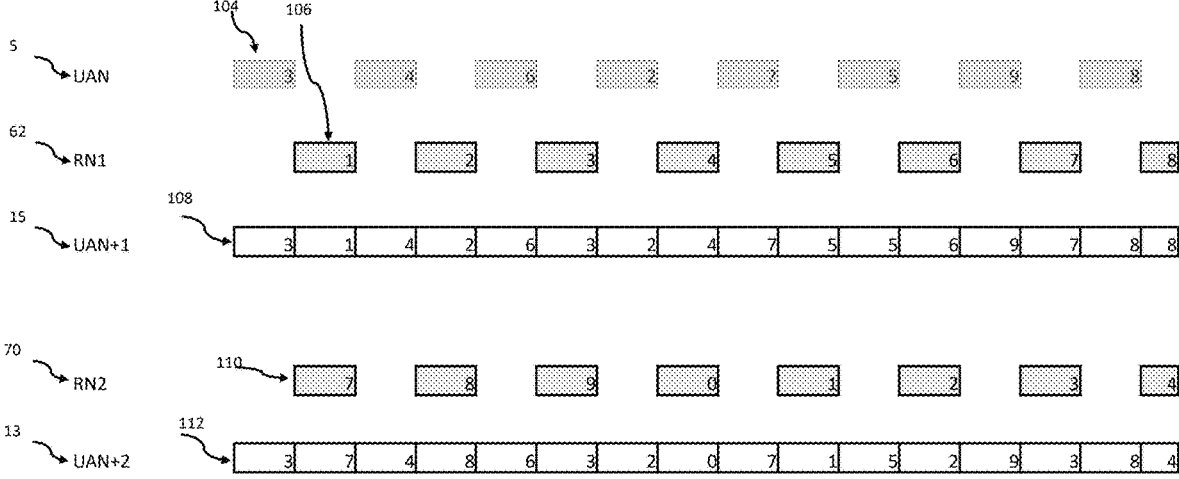

Yet another example of embodiments of the first 15 (UAN+1) and second modified user identifier 13 (UAN+2) generated by combining the same UAN 5 with two different random numbers RN1 62 and RN2 70, by executing an algorithm, at 26, 28, is represented in FIG. 6. In this example, the first modified user identifier 15 (UAN+1), also referenced as 108 for this particular embodiment in FIG. 6, is generated by alternating the digits 104 of the UAN 5 with the digits 106 of the first random number RN1 62. Using the same algorithm, the second modified user identifier 13 (UAN+2), also referenced as 112 for this particular embodiment in FIG. 6, is generated by alternating the digits 104 of the UAN 5 with the digits 110 of the second random number RN2 70.

Figure 7:
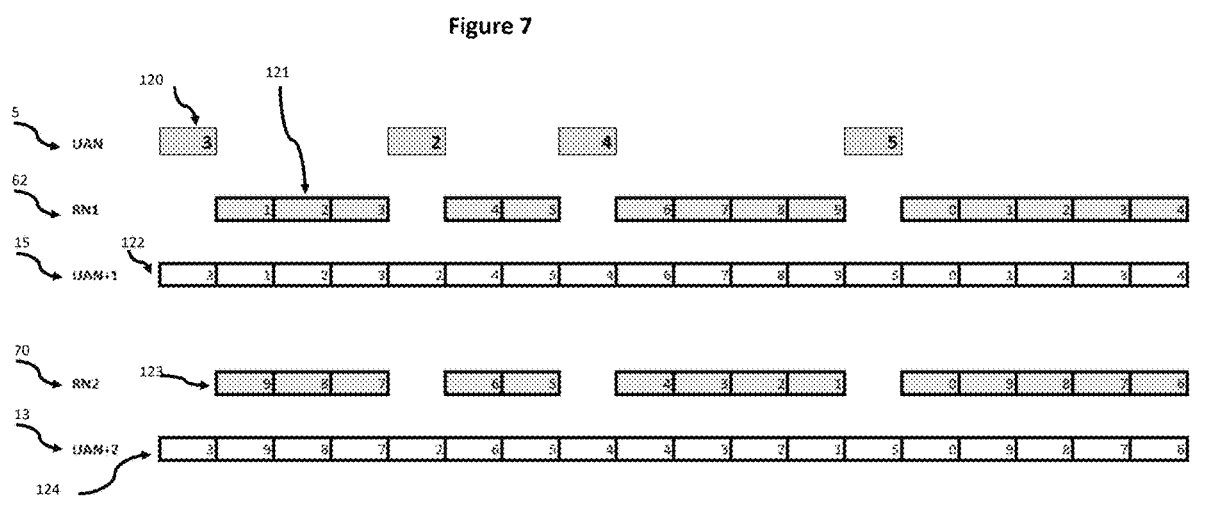

FIG. 7 represents still another example of embodiments of the first 15 (UAN+1) and second modified user identifier 13 (UAN+2) generated by combining the same UAN 5 with two different random numbers, first random number RN1 62 and second random number RN2 70, by executing an algorithm, at 26, 28, in an embodiment of the present method. For each of the first 15 (UAN+1) and second modified user identifier 13 (UAN+2), the value of each digit 120 of the user identifier 5 (UAN) determines how many sequential digits 121 of random number RN1 62, and random number RN2 70, respectively, are inserted after the corresponding digit 120 of the UAN 5. In this example, the first digit 120 of the UAN 5 has value of 3, hence the first three digits 121 of RN1 62 are inserted after the "3" in the first modified user identifier 15 (UAN+1), and so on. In the same manner, the first three digits 123 of RN2 70 are inserted after the "3" in the second modified user identifier 13 (UAN+2), and so on.

Any of these methods for executing the algorithm, at 26, in a registration process to generate the modified user identifiers, 15, 13, may be used in accordance with the authenticating steps described above, for the case in which no device data are used. As should be clear, any of these methods for obfuscating the user identifier using random numbers may also be used to generate the modified user identifiers, 15, 13, for use in the embodiments described herein that also implement device data.

Device data are used in embodiments of the present disclosure to further insure that the second modified user identifier 13' received in the receiving step, at 48, is from the registered user device, and not from, for example, a hijacked or spoofed device. Referring to FIGS. 1A, 2A, and 2B, a User Device Identifier 17, referred to as "UDID" 17, is generated, at 22, in embodiments, by the Authentic Domain Device 226, and stored, at 34, in the registered user device together with the second modified user identifier 13 in the registration process 18, and not with the Authentication Domain Device 226. The UDID 17 is used to identify the approved, registered user device 206 that has been loaded with the SDK 208 and/or the App 209, for further authentications.

The UDID 17 stored in the registered user device during the registration process allows the Authentication Domain to identify an approved user device for authenticating a remote transaction that has been loaded with the SDK 208 and/or the App 209, and which includes the securities and identifiers needed for the Authentication service. For example, each installation of the mobile App 209 on a user device that embeds the user device SDK will also generate and store a Unique Identifier, referred to herein as the User Device Identifier 17 or "UDID." This identifier is unique to the installation of the App 209 from the Service Provider Domain device 204 hosting the requested services, and is not the well-known Universally Unique Identifier, known as the "UUID" associated with a mobile device.

The UDID 17 of the present disclosure is stored, at 32, securely in the underlying operating system of the mobile device, only a single instance of the UDID 17 generated for a registered user can exist on the system 200, and is used to uniquely identify the registered user device. This approach of only allowing a single instance of the App for a specific user adds to the security and should prevent apps from being installed in parallel on a rogue device.

Accordingly, if the App 209 is uninstalled at some point, or the registered user device in which it was installed during the registration process is factory reset, the User Device Identifier 17 will either no longer exist, or will be corrupted or invalid. For example, as part of the Uninstall process of an App, the SDK will attempt to deregister the device from the system 200, however if there is an issue communicating at this point the device record will need to be manually removed through the system management portal.

The UDID 17 of the present disclosure may be a Globally Unique Identifier (GUID) formatted as lower case, with hyphens and no braces. The following is an example: 123e4567-c89b-12d3-a456-426655440000.

In order to ensure that the registered user device initiating the remote transaction has not changed, some additional fixed data from the registered user device, referred to herein as the user device data elements 27 or UDDE 27 (see FIG. 1A) may also be extracted, at 24, during the registration process 18, and used to generate device modified user identifiers 31, 31*a*, 31*b*, for use in the authentication process. The UDDE 27 associate and bind the user device to the SDK or App 209, and may include, for example, but are not limited to, one or more of its software version, hardware details, or its location details, and so on. One or both of the UDID 17 and UDDE 27 may be used in embodiments of the authentication methods of the present disclosure, as described further herein.

For example, referring still to FIGS. 2A, 2B, the first bitwise distance 19 may be calculated, at 30, as the bitwise distance between the first modified user identifier 15 and a modified user identifier 33 that is based on the second modified user identifier 13 generated in the registration process. In embodiments, referring to FIG. 2A, the modified user identifier 33 is a device modified user identifier 31 as shown in step 23 of FIG. 2A. The device modified user identifier 31 combines the second modified user identifier 13 with user device data. The user device data may include the user device identifier (UDID) 17 (FIGS. 1A, 1B), generated, at 22, in embodiments, and stored, at 34, together with the second modified user identifier (UAN+2) 13 in the registered user device in a registration process. The user device data may also, or alternatively, in embodiments, include the user device data elements (UDDE) 27, which are extracted, at 24, from the registered user device in the registration process 18.

Referring again to FIG. 2A, 2B an embodiment of the method of authenticating a remote transaction which also implements device data includes generating, at 21, the two random numbers, RN1 62 and RN2 70; and executing an algorithm (which is described further herein in reference to FIGS. 4-7) to combine, respectively, each of the RN1 62 and RN2 70 with the user identifier 5 (UAN) to generate the first modified user identifier 15 (UAN+1), at 28, and the second modified user identifier 13 (UAN+2), at 26, which include the UAN 5 obfuscated therein, in accordance with any of the algorithms described in reference to FIGS. 4-7. In addition, the user device identifier 17 is generated, at 22, and stored, at 34, together with the second modified user identifier 13 to the registered user device.

The second modified user identifier 13 may be combined with the user device data, in embodiments, in different ways in the registration process. Referring to FIG. 2A, and FIG. 8, for example, the bitwise XOR operator may be applied, at 23, in embodiments, to add binary representations of the second modified user identifier 13 (UAN+2), the user device identifier 17 (UDID) and, in embodiments, the user device data elements 27 (UDDE) to generate an embodiment of the device modified user identifier 31 (UAN+2+DE) that is based on the second modified user identifier 13 from the registration process.

In another embodiment, referring to FIG. 2B and FIG. 10, the bitwise XOR operator may be applied, at 25, in embodiments, to add binary representations of the second modified user identifier 13 (UAN+2), to each of the user device identifier 17 (UDID) and the user device data elements 27 (UDDE) to generate separate device modified user identifiers 31*a*, 31*b* (UAN+2+UDID, UAN+2+UDDE, each of which is based on the second modified user identifier 13 from the registration process. In this embodiment, the second modified user identifier 13 is also used in the authentication process, as illustrated also by FIG. 10.

The first bitwise difference 19 ("DIF1") for use in authenticating the remote transaction in accordance with embodiments of the present disclosure is then calculated in the registration process, at 30, in the embodiment of FIG. 2A, as the bitwise distance between the first modified user identifier 15 (UAN+1) and the device modified user identifier 31 (UAN+2+DE), wherein the device modified user identifier 31 (UAN+2+DE) is calculated in accordance with step 23, in the embodiment of FIG. 2A, e.g., in an XOR calculation to add UAN+2 13, UDID 17, and UDDE 27 (see also FIG. 8). The first bitwise difference 19 (DIF1) is then stored, at 32, together with the first modified user identifier 15 (UAN+1), with the Authentication Domain Device 226; and the second modified user identifier 13 (UAN+2) and the user device identifier 17 (UDID) are loaded, at 34, in embodiments of the registration process 18 represented in FIG. 2A, into the registered user device, which may be a cell phone.

In the embodiment of FIG. 2B, two separate first bitwise distances 192, 194 ("DIF1 UDID" 192, "DIF1 UDDE" 194) for use in authenticating the remote transaction in accordance with embodiments of the present disclosure are calculated, at 30, in FIG. 2B, as the bitwise distance between the first modified user identifier 15 (UAN+1) and each of two device modified user identifiers 31*a*, 31*b* (UAN+2+UDID 31*a*, UAN+2+UDDE 31*b*). Each of the two device modified user identifiers 31*a*, 31*b* is calculated in accordance with step 25, in the embodiment of FIG. 2B, e.g., in an XOR calculation to add UAN+2 13 to each of UDID 17, and UDDE 27 (see also FIG. 10) to generate the two device modified user identifiers 31*a*, 31*b*, incorporating the user device identifier and user device data elements, respectively. The first bitwise distances 192, 194 are then stored, at 32', together with the first modified user identifier 15 (UAN+1), with the Authentication Domain Device 226. The bitwise distance 191 between the first modified user identifier 15 (UAN+1) and the second modified user identifier 13 (UAN+2) from the registration process is also calculated, at 30, and stored, at 32, in the embodiment of FIG. 2B.

Referring again to FIG. 3A, the authentication of a remote transaction may include, in embodiments, utilizing the UDID 17 generated, at 22, and UDDE 27, extracted, at 24, and the device modified user identifier 31 generated, at 23, in an initialization process, such as 18 of FIG. 2A, and an embodiment of the first bitwise distance DIF1 19, generated at 30 from the device modified user identifier 31. The associating step, at 29, referring to FIG. 3A, includes the authentication domain device associating the first modified user identifier 13 and the first bitwise distance 19 with the registered user, wherein the first bitwise distance is generated in the registration process 18, between the first modified user identifier 15, and an embodiment of the device modified user identifier 31 (UAN+2+DE), which is based on the second modified user identifier from the registration process and is calculated in accordance with step 23, of FIG. 2A as described herein.

In the embodiment of FIG. 3B, the authentication of a remote transaction may include, in embodiments, utilizing the UDID 17 generated, at 22, and UDDE 27, extracted, at 24, and the two device modified user identifiers 31a, 31b generated, at 25, in the embodiment of the initialization process of FIG. 2B, and the two first bitwise distances DIF1 192, 194, generated at 30 from the device modified user identifier 31a, 31b. The associating step, at 29, in this embodiment, may include associating each of the first bitwise distance 191, 192, 194, with the registered user and storing them, at 32, which are generated in the registration process 18 between the first modified user identifier, and each of the second modified user identifier 13, and each of the device modified user identifiers 31a, 31b (UAN+2+UDID, UAN+2+UDDE), each of which is based on the second modified user identifier from the registration process and is calculated in accordance with step 25, of FIG. 2B, as described herein.

Referring to FIG. 3A, 3B, in embodiments, the Authentication Domain Device 226 receives, at 48, the second modified user identifier (UAN+2') 13', and the user device identifier (UDID') 17', as well as, in embodiments, the user device data elements 27' (UDDE') from the user device, in the response, at 44, 47 confirming the request (responding Yes 47) for the transaction from the user device. At 49, the device modified user identifier 31', also referred to herein as the extracted device modified user identifier 31' in the particular embodiments shown, that is based on the second modified user identifier (UAN+2') 13' just received, at 48, is generated. The extracted device modified user identifier 31' incorporates the user device data received from the user device, at 44, 47, with the second modified user identifier (UAN+2') 13' just received, at 48, for example, in accordance with embodiments described herein.

In the embodiment of the method shown in FIG. 3A, the extracted device modified user identifier 31' (UAN+2'+DE') is generated, at 49, by applying the XOR operation to the second modified user identifier (UAN+2') 13 just received, at 48, and to the device data just extracted, at 48: for example, the user device identifier (UDID') 17', and in embodiments, the user device data elements' 27' (UDDE'). The extracted device modified user identifier 31' (UAN+2'+ DE') generated from the data received, at 48, including the second modified user identifier (UAN+2) 13' just received, at 48, may be represented, in embodiments as:

$$UAN+2'+DE'=UAN+2'\wedge UDID'\wedge UDDE'.$$

In the embodiment of the method shown in FIG. 3B, extracted device modified user identifiers 31a', 31b' (UAN+ 2'+UDID', UAN+2'+UDDE') may be generated, at 49, by applying the XOR operation to add the second modified user identifier (UAN+2') 13' just received, at 48, to each of the device data just extracted, at 48, for example, the user device identifier (UDID') 17', and the user device data elements 27' (UDDE').

In embodiments, referring to FIG. 3A, a second bitwise distance 51 (DIF2) is then calculated, at 50, that is based on the first modified user identifier 15 stored at the authentication domain device, in the registration process, and on the second modified user identifier 13' just received, at 48, in the receiving step for confirming the transaction from the user device. In particular, in FIG. 3A, the second bitwise distance 51 (DIF2) is calculated between the first modified user identifier 15 from the registration process and the extracted device modified user identifier 31' (UAN+2'+DE'), as calculated, at 49, which is based on the second modified user identifier (UAN+2) 13' just received, at 48, as well as on the device data extracted, at 48.

In the embodiment of the method shown in FIG. 3B, the extracted device modified user identifier 31a', 31b' (UAN+ 2'+UDID', UAN+2'+UDDE') may be generated, at 49, for at least one of, or in embodiments, each of the UDID 17' and UDDE 27' by applying the XOR operation to add the second modified user identifier (UAN+2') 13 just received, at 48, separately to at least one of, or in embodiments, to each of the user device identifier (UDID') 17', and the user device data elements' 27' (UDDE') extracted, at 48. The extracted device modified user identifiers 31a', 31b' generated from the data received, at 48, including the second modified user identifier (UAN+2) 13' just received, at 48, may be represented, in embodiments as:

$$UAN+2'+UDID'=UAN+2'\wedge UDID'$$

$$UAN+2'+UDDE'=UAN+2'\wedge UDDE'.$$

In embodiments, referring to FIG. 3B, the second bitwise distance 51a, 51b (DIF2) is then calculated, at 50, for each of the user device data extracted, at 48, between the first modified user identifier 15 generated in the registration process, and each of the extracted device modified user identifier 31a', 31b', which are based on the second modified user identifier 13' just received, at 48, in the receiving step for confirming the transaction from the user device. The second bitwise distance 51 (DIF2) is also calculated, at 50, between the first modified user identifier 15 generated in the registration process and the second modified user identifier 13' just received, at 48, for use in determining the authenticity of the remote transaction.

The method further includes comparing, at 53, in the various embodiments, the first bitwise distance to the second bitwise distance or, in embodiments, to each of the second bitwise distances to determine, at 52, any anomalies, and to pass on a fail code, at 56, or a pass code, at 58, to the Service Provider, after all checks are completed, at 54.

For example, the Authentication Domain Device 226 (also referred to as "ADD"), in embodiments, referring to FIGS. 3A, 3B, may be configured to determine the following, and take the appropriate action, based on the user's response, at 44, and a comparison of DIF1 to DIF2, but is not limited thereto:

1. Real User is verified by determining that DIF1 and DIF2 are the same, and that User responded Yes, at 47, on the digital wallet App to the request, at 42, to confirm that a registered User is doing the transaction.

2. Request, at 42, may not have been received by the User, at 42: if the User does not respond within a predetermined time, in embodiments, the ADD cannot authenticate. The information is sent to the Service Provider Domain for it to decide whether to accept the transaction of decline it.

3. If a "No" response is received at 45, this indicates a Stolen User ID and password—the real user does not confirm the transaction.

4. DIF1 and DIF2 are compared to determine any anomalies. DIF1 is the original calculation that is stored, at 32, by the ADD (FIGS. 2A, 2B), and in embodiments, by the Service Provider Domain Device 204 ("SP"). DIF2 is calculated, at 50, after receiving consumer response data from the user device, at 48, including the second modified user identifier 13 which incorporates the User Identifier, and device data, such as the UDID, and UDDE. For a good transaction, DIF1 and DIF2 must be the same. If they are not, then there is some anomaly at the User Device and the transaction cannot be authenticated.

5. The user device can be authenticated as the "real cell phone", i.e., the user device registered for the registered user. If a Yes response was received at 47, and the comparison of DIF1 and DIF2, at 53, shows that the two numbers are equal, the user device is authenticated as the real cell phone.

6. A Cell Hack that occurs, e.g., when a user device that was registered for a registered user has been tampered with after the registration process, can be detected by analyzing any difference between DIF1 and DIF2, even though a Yes response was received at 47.

7. If DIF1 and DIF2 are not the same, even though a Yes response was received at 47, the user device was tampered with either by:

Stolen UAN: the incorrect User Identifier (UAN, e.g.) is in the user device, as evidenced by the UAN extracted from the second modified user identifier being returned, at 47, being incorrect Stolen UAN: is indicated by determining that the UDID extracted, at 47, is different than the UDID stored in the User Device at registration, i.e., the User Device is not the registered device Stolen UAN due to a Server Database Hack-Stolen UAN from Registration Database at Service Provider Domain Device 204 is loaded into the Digital Wallet App of a user device that is not the registered user device having the UDID assigned to it at registration will result. Comparing DIF1 and DIF2 shows they are different.

All edit checks are processed and if there are anomalies 54, the failed result code is sent to the SP via API. If the edit check results are good, 54, AD sends the result code to SP via API.

In the embodiment of the method of FIG. 3B, referring also to FIGS. 10-11, the difference calculation DIF2 is created as a bitwise distance between the first modified user identifier 15 (UAN+1) saved in the registration process, and each of:

1) the second modified user identifier 13' (UAN+2') received in the receiving step, at 48;

2) the extracted device modified user identifier 31a' that is based on the second modified user identifier 13' and on the UDID' 17' received in the receiving step, at 48 (generated, in embodiments, by applying XOR to add UAN+2' to UDID' 17'); and 3) the extracted device modified user identifier 31b' that is based on the second modified user identifier 13' and on the UDDE' 27' received in the receiving step, at 48 (generated, in embodiments, by applying XOR to add UAN+2' to UDDE' 27').

For the comparison, the first bitwise distance calculation DIF1 is generated as the bitwise distance between the first modified user identifier 15 (UAN+1) saved in the registration process, and each of:

1) the second modified user identifier 13 (UAN+2) generated in the registration process;

2) the device modified user identifier 31a that is based on the second modified user identifier 13 and on the UDID 17 generated in the registration process, in embodiments, by applying XOR to add UAN+2 to UDID 17); and 3) the device modified user identifier 31b that is based on the second modified user identifier 13 and on the UDDE 27 extracted in the registration process from the registered user device, generated, in embodiments, by applying XOR to add UAN+2 to UDDE 27.

This structure allows three sets of examinations to be done for the edit checks in comparing DIF1 and DIF2 for each of these three cases, so that each of the DIF2 comparisons to the corresponding DIF1 indicates one type of fraudulent activity, as follows:

1) User Identifier Results: If the $1^{st}$ calculated DIF1 and DIF2 as described supra are different, this indicates the User Identifer, such as a UAN was stolen from host database. If the $1^{st}$ part of DIF1 and DIF2 are the same, UAN is correct.

2) UDID Results: If the second calculated DIF1 and DIF2 as described supra are different, then the user device in the remote transaction is not the registered user device that the UDID was loaded into during registration.

3) UDDE Results: If the third calculated DIF1 and DIF2 as described supra are different, something in the user device has changed since registration, indicating it may have been hacked, or it is not the registered user device.

Figure 17:
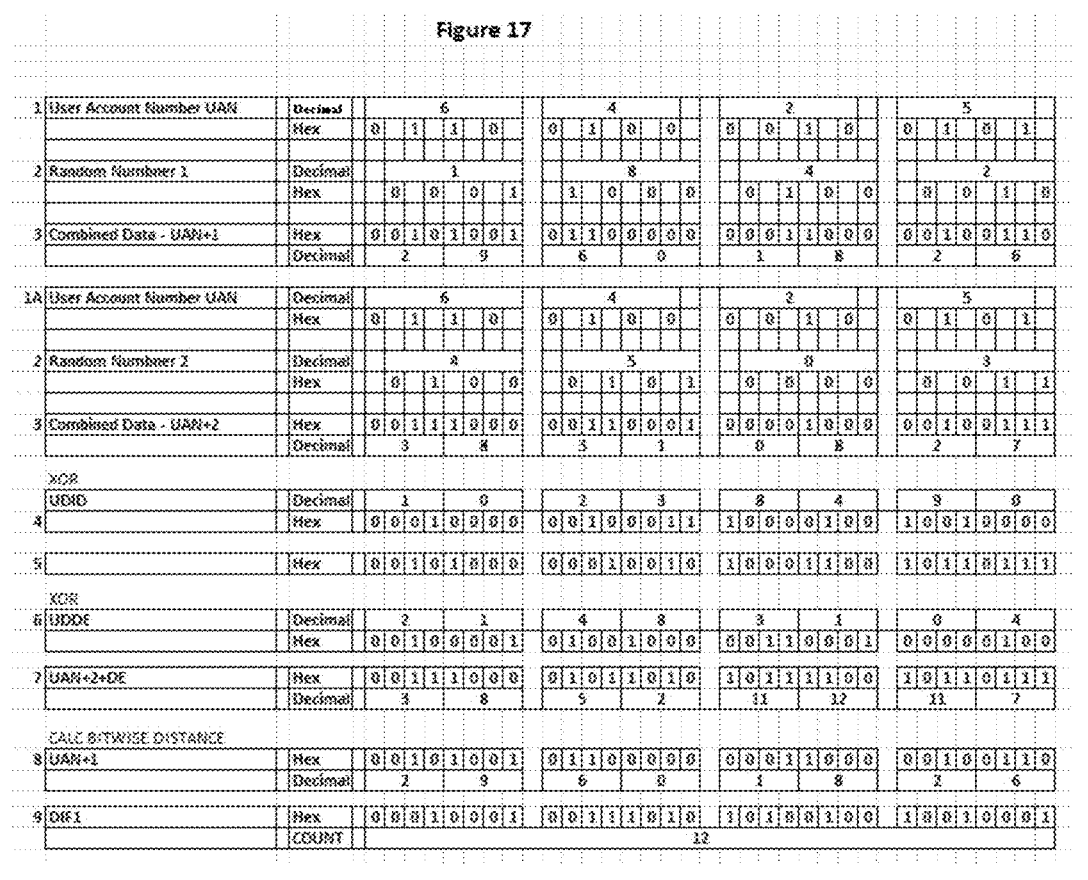
Figure 18:
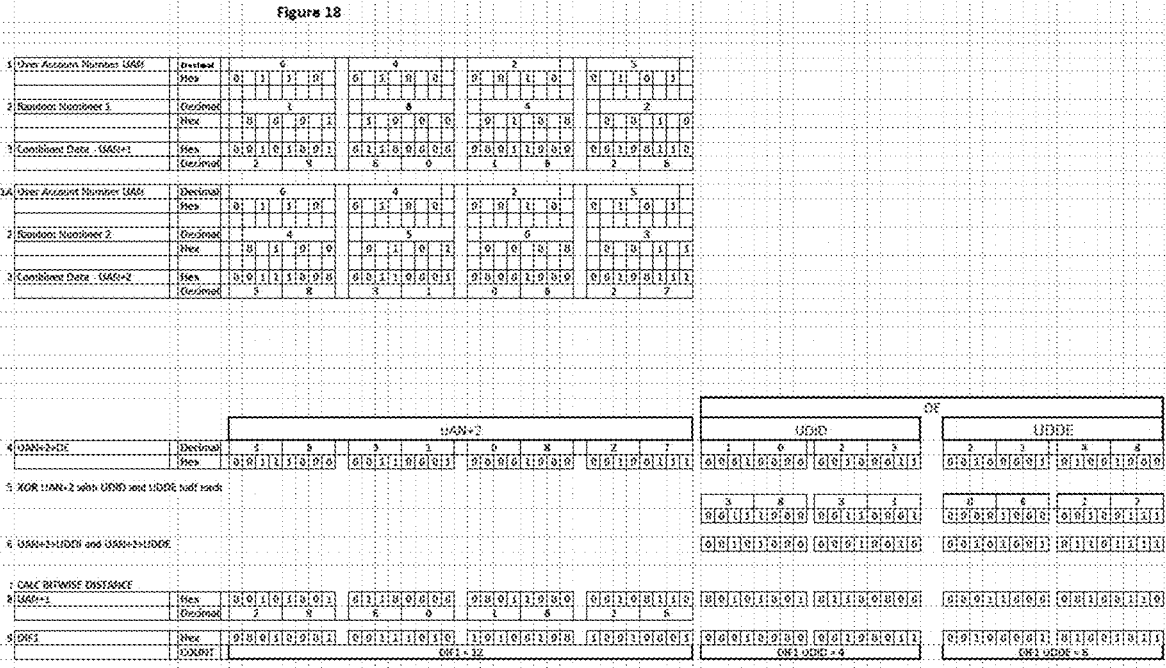
FIG. 18 is a detailed example of an embodiment of a registration process in accordance with FIG. 2B, based on the same modified user identifiers represented in FIG. 16, and which includes generating the bitwise distance between a first and second modified user identifier, and between the first modified user identifier and each of a separate device modified user identifier, one incorporating a user device identifier and the other user device data elements associated with the registered user device.

FIGS. 16-18 provide a detailed example of a particular embodiment, which starts with a User Account Number as the User Identifier, 6425, converted to a hexadecimal. FIG. 16 provides an example of generating a first and second modified user identifier using two different random numbers and the algorithm represented in FIG. 6 to obfuscate the user identifier therein. The example, further exemplified in FIG. 17, includes generating a device modified user identifier that incorporates user device data, both a user device identifier and user device data elements associated with a registered user device, with the second modified user identifier generated in FIG. 16, and generating the first bitwise difference in accordance with an embodiment of a registration process of FIG. 2A.

FIG. 18 is a detailed example of an embodiment of a registration process in accordance with FIG. 2B, based on the same modified user identifiers represented in FIG. 16, and which includes generating the bitwise distance between a first and second modified user identifier, and between the first modified user identifier and each of a separate device modified user identifier, one incorporating a user device identifier and the other, user device data elements associated with the registered user device.

The authentication steps are then followed for the case of FIGS. 16-17 in accordance with the embodiment of FIG. 3A, and for the case of FIGS. 16, 18 in accordance with the embodiment of FIG. 3B.

The current invention detects and blocks fraudulent transactions, without the use of encryption, which can be broken by Quantum Computer attacks, or keys, which are subject to theft. This not only reduces the actual fraud value, but it also stops the Service Provider spending time and effort to manage such fraudulent cases, all of which helps Service Provider's bottom line by reduction of fraud costs.

The present invention is not meant to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

It is also to be understood that the terminology used herein is for the purpose of describing particular embodiments only, and is not intended to be limiting.

While the invention has been particularly shown and described with reference to specific embodiments, it should be apparent to those skilled in the art that the foregoing is illustrative only and not limiting, having been presented by way of example only. Various changes in form and detail may be made therein without departing from the spirit and scope of the invention. Therefore, numerous other embodiments are contemplated as falling within the scope of the present invention as defined by the accompanying claims and equivalents thereto.

What is claimed is:

1. A method for authenticating a remote transaction between a service request computer or mobile device operated by a requesting user and a service provider computer hosting services remotely accessible via an Internet connection, the method including: generating, by a processor in an authentication computer, in a registration process for a registered user and a registered user device associated therewith, and wherein a user identifier is associated with the registered user for the services hosted by the service provider computer, a first modified user identifier based on the user identifier associated with the registered user and a first random number, and generating, by the processor in the authentication computer, in the registration process, a second modified user identifier that is different from the first modified user identifier based on the user identifier and a second random number that is different than the first random number;

generating, by the processor in the authentication computer, in the registration process, a first bitwise distance associated with the registered user, wherein the first bitwise distance is calculated between the first modified user identifier and a modified user identifier that is based on the second modified user identifier generated in the registration process; storing, by the authentication computer, in the registration process, in a storage unit associated with the authentication computer, the first modified user identifier and the first bitwise distance generated in the registration process only in the authentication computer and not in the registered user device;

storing, by the authentication computer, in the registration process, the second modified user identifier generated in the registration process only in the registered user device and not in the authentication computer; receiving, after the registration process, by the authentication computer via the service provider computer, a request for a transaction with the service provider computer from the requesting user, initiated via a user interface in the service request computer or mobile device, the request including the user identifier associated with the registered user for the services, wherein the service provider computer is in communication with the service request computer or mobile device via the Internet connection, and the authentication computer is in communication with the service provider computer via one of a hardware interface and an API;

sending, via the authentication domain device, in response to receiving the request for the transaction from the service request computer or mobile device, a request to a user device that is purportedly the registered user device, using registration data associated with the registered user device for the registered user, to confirm that the request from the service request computer or mobile device operated by the requesting user is from the registered user, wherein the user device is in communication with the authentication computer via a communications link or over-the-air network;

receiving, by the authentication computer, in a response confirming the request for the transaction from the user device, the second modified user identifier from the user device;

calculating, by a processor in the authentication computer, after said receiving in the response confirming the request, a second bitwise distance between the first modified user identifier generated and stored in the authentication computer in the registration process, and the modified user identifier that is based on the second modified user identifier just received in the receiving step for confirming the transaction from the user device;

comparing, by the processor in the authentication computer, the first bitwise distance and the second bitwise distance;

determining, by the processor in the authentication computer, whether the transaction requested by the requesting user from the service request computer or mobile device is authentic and initiated by the registered user, based on said comparing, wherein the first bitwise distance equals the second bitwise distance in an authentic transaction with the registered user, and wherein a difference between the first bitwise distance and the second bitwise distance indicates anomalies in the second bitwise distance that indicate a type of fraudulent activity; and sending, by the authentication computer, to the service provider computer, a code corresponding to allowing or declining the remote transaction based on the presence or absence of said anomalies, and wherein the code identifies the type of fraudulent activity.

2. The method of claim 1, wherein the code sent in the sending, by the authentication computer, to the service provider computer, terminates the remote transaction, in response to the authentication computer receiving a denial of the request for the transaction from the registered user device, indicating that the requesting user is not the registered user.

3. The method of claim 1, wherein the modified user identifier generated, by the authentication computer, in the registration process, is a device modified user identifier that combines the second modified user identifier with user device data, wherein the user device data includes one of a user device identifier generated by the authentication computer for the registered user device in the registration process, and a user device data element bound to the registered user device that is extracted, in the registration process, from the registered user device, and wherein the first bitwise distance is calculated, in the registration process, between the first modified user identifier and the device modified user identifier and stored only in the authentication computer and not in the registered user device, wherein said determining includes determining whether the user device used in the transaction is the registered user device.

4. The method of claim 3, wherein the user device data element includes one or more of a software version, hardware details, and location details for the registered user device.

5. The method of claim 3, wherein said receiving, by the authentication computer, in the response confirming the request for the transaction from the user device, further includes receiving the user device data from the user device purported to be the registered user device, which includes the one of the user device identifier and the user device data element, in the response, wherein in the authenticated remote transaction, the user device data associated with the registered user in the registration process is the same as the user device data received from the user device in the response confirming the request for the transaction, and wherein the type of fraudulent activity indicated by said anomalies in the second bitwise difference includes at least one of the user device not being the registered user device and the registered user device being hacked.

6. The method of claim 5, wherein the device modified user identifier generated in the registration process is calculated by applying an XOR operation to add the second modified user identifier generated in the registration process to the user device data from the registration process.

7. The method of claim 6, wherein said calculating the second bitwise distance includes first generating an extracted modified user identifier that is based on the second modified user identifier received in the receiving step for confirming the transaction by applying the XOR operation to add the second modified user identifier and the user device data, both received in said receiving in the response confirming the request, and then calculating the second bitwise distance between the first modified user identifier generated in the registration process, and the extracted modified user identifier.

8. The method of claim 3, wherein the device modified user identifier is generated in the registration process by applying an XOR operation to add the second modified user identifier generated in the registration process to the one of the user device identifier and the user device data element, and wherein the first bitwise distance is calculated between the first modified user identifier and the one of the user device identifier and the user device data element from the registration process, and wherein said receiving, by the authentication computer, in the response confirming the request for the transaction from the user device, further includes receiving the one of the user device identifier and the user device data element, in the response, wherein in the authenticated remote transaction, the one of the user device identifier and the user device data element associated with the registered user in the registration process is the same as the one of the user device identifier and the user device data element received in the response confirming the request for the transaction.

9. The method of claim 8, wherein said calculating the second bitwise distance includes first generating an extracted modified user identifier that is based on the second modified user identifier received in the receiving step for confirming the transaction by applying the XOR operation to add the second modified user identifier and the one of the user device identifier and the user device data element received in said receiving in the response confirming the request, and then calculating the second bitwise distance between the first modified user identifier generated in the registration process, and the extracted modified user identifier.

10. The method of claim 1, wherein the modified user identifier is the second modified user identifier generated in the registration process, and the first bitwise distance is generated, in the registration process, between the first modified user identifier and the second modified user identifier generated in the registration process from the user identifier and the first and second random number, respectively; and wherein the second bitwise distance is calculated in said calculating step between the first modified user identifier formed in the registration process, and the second modified user identifier received in the receiving step for confirming the transaction from the user device, and wherein said anomalies in the second bitwise distance indicate that the user identifier was stolen from a database associated with the service provider computer.

11. The method of claim 1, further including generating the first modified user identifier by executing an algorithm that alternates each digit of the user number with a sequential digit of the first random number, and generating the second modified user identifier by executing the algorithm that alternates each digit of the user number with a sequential digit of the second random number.

12. The method of claim 1, further including generating the first modified user identifier by executing an algorithm that inserts a predetermined number of sequential digits of the first random number after each sequential digit of the user identifier, and generating the second modified user identifier by executing the algorithm that inserts the predetermined number of sequential digits of the second random number after each sequential digit of the user identifier.

13. The method of claim 1, further including generating the first modified user identifier and the second modified user identifier by executing an algorithm that concatenates the user identifier with the first random number and the second random number, respectively.

14. The method of claim 13, further including generating a hash value for each of the first modified user identifier and the second modified user identifier.

15. The method of claim 1, further including generating the first modified user identifier by executing an algorithm that inserts a number of sequential digits of the first random number after a digit of the user identifier, wherein the number of sequential digits inserted is determined by the value of the digit, and generating the second modified user identifier by executing the algorithm that inserts the number of sequential digits of the second random number after the digit of the user identifier, wherein the number of sequential digits inserted is determined by the value of the digit.

16. The method of claim 9, wherein said receiving, by the authentication computer, in the response confirming the request for the transaction from the user device, includes receiving each of the user device identifier and the user device data element, wherein the device modified user identifier is generated for each of the user device identifier and the user device data element in the registration process, the first bitwise distance is calculated between the first modified user identifier and each of the user device identifier and the user device data element from the registration process, and wherein the second bitwise distance is calculated, in said calculating step, by first generating the extracted modified user identifier for each of the user device identifier and the user device data element received in the response confirming the request for the transaction, by applying the XOR operation to add the second modified user identifier to each of the user device identifier and the user device data element received in said receiving in the response confirming the request, and then calculating, for each of the user device identifier and the user device data element, the second bitwise distance between the first modified user identifier from the registration process and the extracted modified user identifier corresponding to each of the user device identifier and the user device data element.

17. The method of claim 16, wherein the first bitwise distance is generated, in the registration process, between the first modified user identifier and the second modified user identifier generated in the registration process; and wherein the second bitwise distance is also calculated in said calculating step between the first modified user identifier formed in the registration process, and the second modified user identifier received in the receiving step for confirming the transaction from the user device, and wherein said comparing the first bitwise distance and the second bitwise distance includes comparing the first bitwise distance to each of: the second bitwise distance between the first modified user identifier formed in the registration process, and the second modified user identifier received in the receiving step; and the second bitwise distance between the first modified user identifier from the registration process and the extracted modified user identifier for each of the user device identifier and the user device data element received in the response confirming the request for the transaction.

18. The method of claim 17, wherein anomalies in the second bitwise distance between the first modified user identifier formed in the registration process, and the second modified user identifier received in the receiving step indicate the user identifier was stolen.

19. The method of claim 17, wherein anomalies in the second bitwise distance corresponding to the user device identifier, which is calculated in said calculating step between the first modified user identifier formed in the registration process, and the extracted modified user identifier generated by applying the XOR operation to add the second modified user identifier and the user device identifier that were received in said receiving in the response confirming the request, indicate the user device requesting the remote transaction is not the registered user device in which the user device identifier was stored in the registration process.

20. The method of claim 17, wherein anomalies in the second bitwise distance corresponding to the user device data element indicate a change in the user device after the registration process, wherein the second bitwise distance is calculated in said calculating step between the first modified user identifier formed in the registration process, and the extracted modified user identifier generated by applying the XOR operation to add the second modified user identifier and the user device data element received in said receiving in the response confirming the request.

21. The method of claim 1, further including dynamically updating the first modified user identifier and the first bitwise distance generated in the registration process and stored in the storage unit associated with the authentication computer, and the second modified user identifier and the user device data generated in the registration process and stored at the registered user device, in response to one of a lapse of a predetermined time interval, a predetermined number of fail codes received, a predetermined number of transactions, a failed authentication, and a user request.

* * * * *